United States Patent
Yoo

(10) Patent No.: US 9,098,703 B2
(45) Date of Patent: Aug. 4, 2015

(54) SOC WITH SECURITY FUNCTION AND DEVICE AND SCANNING METHOD USING THE SAME

(75) Inventor: InSeon Yoo, Osan-Si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 66 days.

(21) Appl. No.: 13/210,657

(22) Filed: Aug. 16, 2011

(65) Prior Publication Data
US 2012/0047366 A1 Feb. 23, 2012

(30) Foreign Application Priority Data
Aug. 19, 2010 (KR) .................. 10-2010-0080552

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 9/00* | (2006.01) |
| *G06F 15/16* | (2006.01) |
| *G06F 17/00* | (2006.01) |
| *G06F 21/56* | (2013.01) |
| *H04L 29/06* | (2006.01) |

(52) U.S. Cl.
CPC ............ *G06F 21/566* (2013.01); *G06F 21/567* (2013.01); *H04L 63/145* (2013.01); *H04L 63/0218* (2013.01)

(58) Field of Classification Search
CPC ....... H04L 63/20; H04L 63/12; H04L 63/126; H04L 63/022; H04L 63/0428; H04L 63/0218; H04L 63/145; G06F 21/56; G06F 21/564; G06F 21/562; G06F 21/566; G06F 21/567
USPC ......................... 726/22–25, 11–13
See application file for complete search history.

(56) References Cited

U.S. PATENT DOCUMENTS

| | | | | |
|---|---|---|---|---|
| 5,144,665 | A * | 9/1992 | Takaragi et al. ................ 380/30 |
| 6,970,562 | B2 * | 11/2005 | Sandhu et al. .................. 380/30 |
| 7,146,305 | B2 * | 12/2006 | van der Made ................ 703/22 |
| 7,370,188 | B2 * | 5/2008 | Rothman et al. ................ 713/2 |
| 7,496,692 | B2 * | 2/2009 | Holm et al. ....................... 710/8 |
| 7,568,233 | B1 * | 7/2009 | Szor et al. ...................... 726/25 |

(Continued)

FOREIGN PATENT DOCUMENTS

| | | |
|---|---|---|
| EP | 1802030 A1 | 6/2007 |
| JP | 2007141102 A | 6/2007 |

(Continued)

OTHER PUBLICATIONS

Communication dated Apr. 9, 2012 issued by the Korean Intellectual Property Office in counterpart Korean Patent Application No. 10-2010-0080552.

(Continued)

*Primary Examiner* — Tae Kim
(74) *Attorney, Agent, or Firm* — Sughrue Mion, PLLC

(57) ABSTRACT

A system-on-chip (SOC) for semiconductor intellectual property (IP), a device including the same, and a method of operating the same are provided. The SOC includes: an interface which receives scanning data from a main module in which the SOC is mounted; and an anti-virus engine which determines whether a virus exists in the received scanning data. Accordingly, the security of a device is tightened.

19 Claims, 26 Drawing Sheets

(56) References Cited

U.S. PATENT DOCUMENTS

| | | | |
|---|---|---|---|
| 7,624,269 B2* | 11/2009 | Appenzeller et al. | 713/171 |
| 7,870,394 B2* | 1/2011 | Repasi et al. | 713/188 |
| 8,631,494 B2* | 1/2014 | Hamid | 726/24 |
| 2002/0016925 A1* | 2/2002 | Pennec et al. | 713/201 |
| 2002/0076042 A1 | 6/2002 | Sandhu et al. | |
| 2003/0070087 A1* | 4/2003 | Gryaznov | 713/201 |
| 2005/0278551 A1* | 12/2005 | Goodnow et al. | 713/193 |
| 2005/0278783 A1* | 12/2005 | Chien et al. | 726/22 |
| 2006/0048228 A1* | 3/2006 | Takemori et al. | 726/22 |
| 2006/0064755 A1* | 3/2006 | Azadet et al. | 726/24 |
| 2006/0090084 A1* | 4/2006 | Buer | 713/189 |
| 2006/0095965 A1* | 5/2006 | Phillips et al. | 726/22 |
| 2006/0242686 A1 | 10/2006 | Toda et al. | |
| 2006/0265486 A1* | 11/2006 | Killian et al. | 709/223 |
| 2007/0094420 A1* | 4/2007 | Holm et al. | 710/8 |
| 2007/0174916 A1* | 7/2007 | Ching | 726/24 |
| 2007/0226797 A1* | 9/2007 | Thompson et al. | 726/22 |
| 2007/0234072 A1* | 10/2007 | Kudelski | 713/190 |
| 2007/0294688 A1 | 12/2007 | Motoki et al. | |
| 2008/0028234 A1* | 1/2008 | Ducharme | 713/189 |
| 2008/0047008 A1* | 2/2008 | Cho et al. | 726/22 |
| 2008/0072068 A1* | 3/2008 | Wang et al. | 713/191 |
| 2008/0235746 A1* | 9/2008 | Peters et al. | 725/111 |
| 2009/0063865 A1* | 3/2009 | Berenbaum et al. | 713/180 |
| 2009/0282485 A1* | 11/2009 | Bennett | 726/24 |
| 2009/0288166 A1* | 11/2009 | Brown et al. | 726/23 |
| 2010/0310068 A1* | 12/2010 | Fischer | 380/43 |
| 2011/0093953 A1* | 4/2011 | Kishore et al. | 726/24 |
| 2011/0307633 A1* | 12/2011 | Maietta | 710/18 |

FOREIGN PATENT DOCUMENTS

| | | | |
|---|---|---|---|
| JP | 2009223908 A | 10/2009 | |
| KR | 100750377 B1 | 8/2007 | |
| WO | 02086717 A1 | 10/2002 | |
| WO | 2004075056 A | 9/2004 | |

OTHER PUBLICATIONS

Communication dated Sep. 12, 2013, issued by the State Intellectual Property Office of the People's Republic of China in corresponding Application No. 201110242723.9.

Communication, dated Apr. 12, 2013, issued by the Japanese Patent Office in counterpart Japanese Application No. 2011-179825.

Masato, Edahiro; vol. 3 System On Chip, The Institute of Electronics, Information and Communication Engineers [Knowledge base], Feb. 1, 2010, p. 1-2, [Search on Apr. 3, 2013], <URL: http://www.ieice-hbkb.org/files/10/10gun__03hen_ab.pdf#page=>.

Yoshio, Hirose; Chapter 1 Component of SoC, The Institute of Electronics, Information and Communication Engineers [Knowledge base], Feb. 1, 2010, p. 1-6 [Search onApr. 3, 2013], <URL: http://www.ieice-hbkb.org/files/10/10gun__03hen_01.pdf>.

Chinese Office Action dated Dec. 29, 2014 issued in corresponding Chinese Patent Application No. 201110242723.9.

Communication dated Jun. 13, 2014 issued by the State Intellectual Property Office of P.R. China in counterpart Chinese Patent Application No. 201110242723.9.

* cited by examiner

SOC WITH SECURITY FUNCTION AND DEVICE AND SCANNING METHOD USING THE SAME

CROSS-REFERENCE TO RELATED APPLICATION

This application claims priority from Korean Patent Application No. 10-2010-0080552, filed on Aug. 19, 2010 in the Korean Intellectual Property Office, the disclosure of which is incorporated herein by reference in its entirety.

BACKGROUND

1. Field

Methods and apparatuses consistent with exemplary embodiments relate to a system-on-chip (SOC) with a security function and a device and a scanning method using the same.

2. Description of the Related Art

Electronic and electric devices (hereinafter, referred to as a 'device') have been used for various purposes. For example, devices such as personal computers, servers, mobile phones, personal digital assistances (PDAs), or smart phones support additional functions besides their original functions, such as financial transactions, Internet shopping, or Internet telephone services. However, such additional functions are supported through networks in many cases and the devices become more likely to be exposed to malware such as viruses when they perform the additional functions. Following a growing trend toward utilization of a system on chip (SOC) for semiconductor intellectual property (IP), a SOC capable of tightening security of the devices has been demanded.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide a system-on-chip (SOC) and a device and a scanning method using the same.

One or more exemplary embodiments also provide a SOC for semiconductor intellectual property (IP) with a security function, and a device and a scanning method using the same.

One or more exemplary embodiments also provide a virus scanning method using a SOC or a SOC for semiconductor IP.

According to an aspect of an exemplary embodiment, there is provided a system-on-chip (SOC) for semiconductor intellectual property (IP), the SOC including: an interface which receives scanning data; a decryption unit which decrypts encrypted signature data; and an anti-virus engine which determines whether a virus exists in the scanning data using the decrypted signature data.

According to an aspect of another exemplary embodiment, there is provided a device including: a main module which has scanning data to determine whether a virus exists therein; and a SOC for semiconductor IP which receives the scanning data from the main module and determines whether a virus exists in the scanning data using updatable signature data.

According to an aspect of still another exemplary embodiment, there is provided a method for scanning whether a virus exists in scanning data which operates in a main board of a device, the method including: mounting a SOC for semiconductor IP for determining whether a virus exists in the scanning data in the main board; receiving the scanning data from the main board, by the SOC, and comparing the scanning data and updatable signature data and determining whether a virus exists in the scanning data, by the SOC.

Additional aspects and advantages of exemplary embodiments will be set forth in the detailed description, will be obvious from the detailed description, or may be learned by practicing exemplary embodiments.

BRIEF DESCRIPTION OF THE DRAWING FIGURES

The above and/or other aspects will be more apparent by describing in detail exemplary embodiments with reference to the accompanying drawings in which.

DETAILED DESCRIPTION OF EXEMPLARY EMBODIMENTS

Exemplary embodiments will now be described more fully with reference to the accompanying drawings to clarify aspects, features and advantages. Exemplary embodiments may, however, be embodied in many different forms and should not be construed as limited to the exemplary embodiments set forth herein. Rather, these exemplary embodiments are provided so that this disclosure will be thorough and complete, and will fully convey the scope of the inventive concept to those of ordinary skill in the art. It will be understood that when an element, layer or region is referred to as being "on" another element, layer or region, the element, layer or region can be directly on another element, layer or region or intervening elements, layers or regions.

The terms used herein are for the purpose of describing exemplary embodiments and are not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, layers, regions, elements, components, and/or groups thereof, but do not preclude the presence or addition of one or more other features, integers, steps, operations, layers, regions, elements, components, and/or groups thereof. As used herein, the term "and/or" includes any and all combinations of one or more of the associated listed items.

Figure 1:
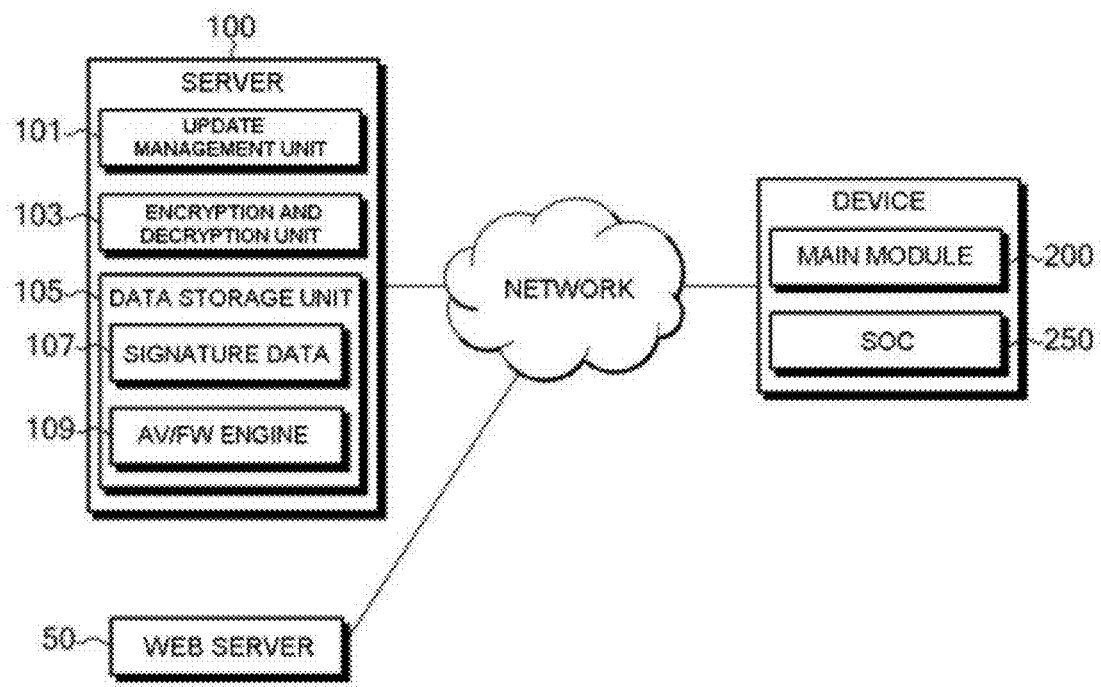
FIG. 1 is a block diagram illustrating a system using a device in which a system-on-chip (SOC) is mounted according to an exemplary embodiment.

FIG. 1 is a block diagram illustrating a system using a device in which a system-on-chip (SOC) is mounted according to an exemplary embodiment.

Referring to FIG. 1, a system according to an exemplary embodiment includes a device and a server 100 (hereinafter, referred to as an 'update server') communicating with the device.

The device includes a main module 200 and a SOC 250. The main module 200 and the SOC 250 may be mounted on a main board. The SOC 250 may be realized as a SOC for semiconductor intellectual property (IP) (e.g., semiconductor IP core or semiconductor IP block) or a general SOC. For convenience of explanation, the general SOC refers to all types of chips except for the SOC for semiconductor IP. Also, the term 'SOC' refers to both the general SOC and the SOC for semiconductor IP throughout the specification as long as a special benefit cannot be obtained by discriminating them. Also, the term 'virus' used in this specification contains all types of malicious codes that cause malfunction of the device.

The SOC 250 receives data such as execution files or data files, which are used or operated in the main module 200 (referred to as 'scanning data'), from the main module 200, and determines whether a virus exists in the scanning data or not. To achieve this, the SOC 250 may include an anti-virus engine as will be described below.

According to an exemplary embodiment, the SOC 250 may determine whether a virus exists in the scanning data by comparing the scanning data and signature data.

The signature data may be stored in and managed by the main module 200 or the SOC 250. If the signature data is stored in the main module 200, the SOC 250 receives the signature data from the main module 200 and performs a virus scanning operation.

The update server 100 may transmit signature data for updating (i.e., updating signature data) to the device. According to an exemplary embodiment, the update server 100 may transmit the signature data for updating to the device according to its own update schedule (hereinafter, referred to as a 'push method'). Alternatively, the update server 100 may transmit the signature data for updating to the device if there is an update request from the device (hereinafter, referred to as a 'pull method').

According to an exemplary embodiment, the update server 100 may include data for updating the anti-virus engine (hereinafter, referred to as an 'AV' or 'AV engine') or a firewall (hereinafter, as a 'firewall engine', an 'FW', or an 'FW engine'), which are included in the SOC 250, and may transmit this data to the device in a pull method or a push method similarly to when the update server 100 transmits the signature data. The pull method or the push method is merely an example and the present disclosure is not limited to these methods. The data for updating may be transmitted to the device in a combination of these methods or in any other different method.

According to an exemplary embodiment, the update server 100 may encrypt the data for updating when transmitting the data for updating to the device. In this specification, the 'data for updating' includes at least one of 'firewall data for updating', 'anti-virus engine data for updating', and 'signature data for updating', and includes all of the above three data or one or more of the above three data according to a situation.

According to an exemplary embodiment, the update server 100 may encrypt the data for updating when transmitting the data for updating to the device. According to an exemplary embodiment, a new encryption key may be used every time that a session is established between the update server 100 and the device.

Figure 20:
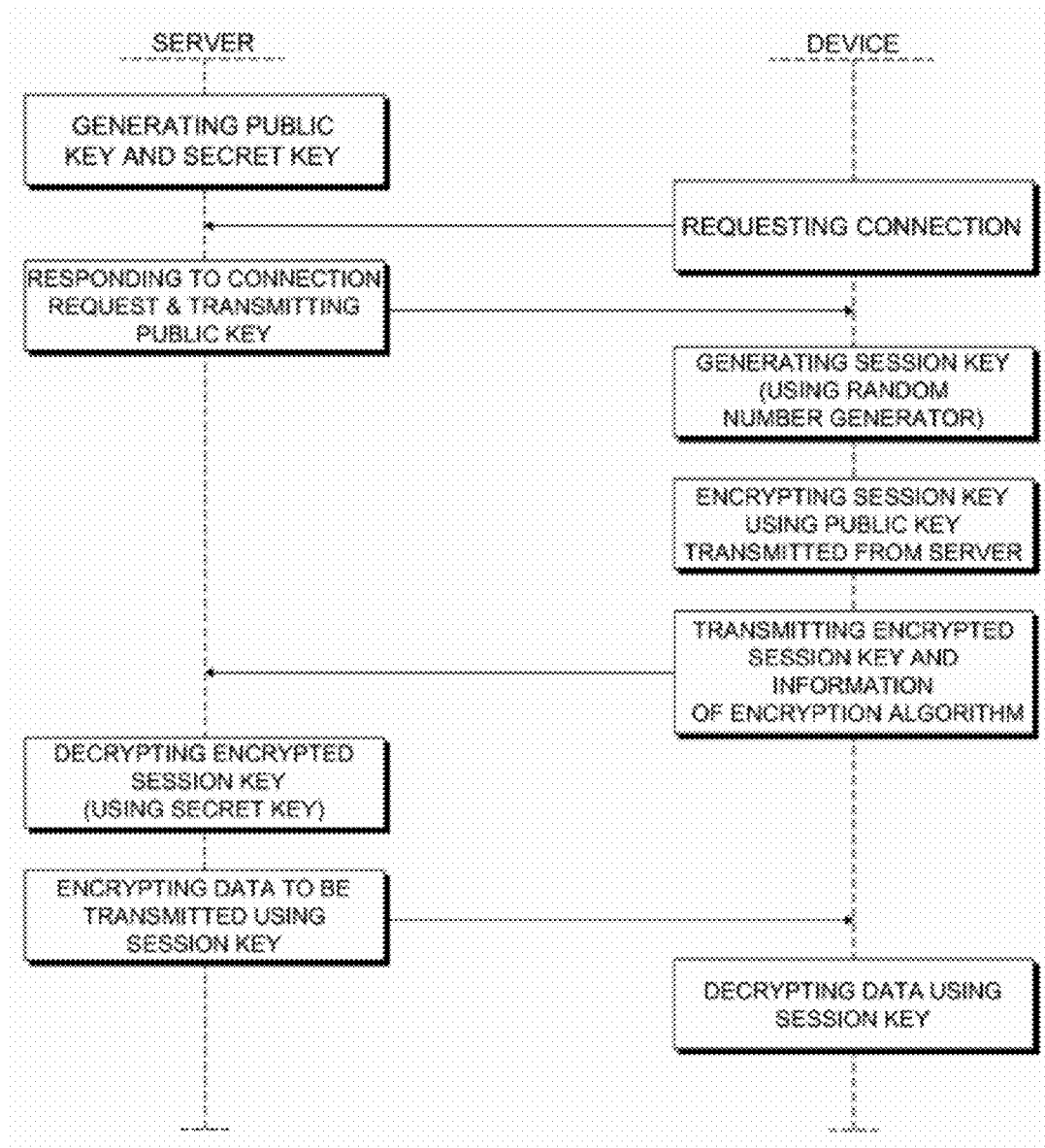
FIG. 20 is a flowchart illustrating an encrypting and decrypting process used in the virus scanning method using the SOC according to an exemplary embodiment.

According to an exemplary embodiment, the update server 100 may include an update management unit 101, an encryption and decryption unit 103, and a data storage unit 105. The data storage unit 105 may store the signature data for updating and the AV and/or the FW engine. FIG. 20 is a flowchart illustrating an encrypting and decrypting process used in a virus scanning method using a SOC according to an exemplary embodiment. An encrypting operation of the update server 100 will be explained in detail below with reference to FIGS. 1 and 20.

Referring to FIGS. 1 and 20, the encryption and decryption unit 103 of the update server 100 may generate a public key and a secret key. The public key and the secret key are asymmetric keys which are paired with each other and may be a public key and a secret key that are used in an RSA algorithm. If there is a connection request from the device to receive the data for updating or if the update server 100 intends to transmit the data for updating to the device, the update server 100 may transmit the public key to the device.

The device may generate a session key and encrypt the session key using the public key transmitted from the update server 100 and an asymmetric key encryption algorithm (for example, an RSA algorithm). The asymmetric key encryption algorithm is an algorithm that has been already agreed by the update server 100.

In the present exemplary embodiment, the session key is a symmetric key that is used in a symmetric key encryption algorithm (for example, an AES-128 algorithm).

The device transmits the session key encrypted with the public key and information regarding the symmetric key encryption algorithm to the update server 100. The information regarding the symmetric key encryption algorithm may be transmitted to the server 100 without being encrypted. Alternatively, the information regarding the symmetric key encryption algorithm may be encrypted with the public key.

According to an exemplary embodiment, the update server 100 may decrypt the session key using the secret key which is paired with the public key distributed to the device. Also, if the information regarding the symmetric key encryption algorithm has been encrypted with the public key and transmitted from the device, the update server 100 may decrypt the information of the symmetric key encryption algorithm using the secret key.

The update server 100 may select an encryption algorithm to be used based on the information regarding the encryption algorithm. After that, the update server 100 encrypts the data for updating using the selected encryption algorithm and the session key, and transmits the data to the device.

The device decrypts the data transmitted from the data server 100 using the session key and performs an updating operation.

In the present exemplary embodiment, the session key is encrypted and transmitted in the asymmetric key encryption scheme and the data for updating is encrypted and transmitted in the symmetric key encryption scheme. However, this is merely an example. The session key and the data for updating may be encrypted in only the asymmetric key encryption scheme or the symmetric key encryption scheme. Also, the session key is encrypted in the symmetric key encryption scheme, whereas the data for updating is encrypted in the asymmetric key encryption scheme. As the asymmetric key encryption scheme, the RSA encryption is used. However, it is understood that another exemplary embodiment is not limited thereto. For example, another encryption scheme such as Rabin encryption, ElGamal encryption, or elliptic curve encryption may be used. Also, as the symmetric key encryption scheme, the AES-128 is used. However, it is understood that another exemplary embodiment is not limited thereto. For example, another encryption scheme such as DES encryption may be used.

Referring back to FIG. 1, the data for updating transmitted from the update server 100 to the device is transmitted to the main module 200 and then transmitted to the SOC 250. To achieve this, the main module 200 of the device may include an over the air (OTA) interface (not shown) to receive the data for updating from the update server 100 in an OTA communication method or a network interface (not shown) to communicate with the update server 100 through a network. According to an exemplary embodiment, the signature data may be stored in and managed by the main module 200 rather than the SOC 250. In this case, the signature data for updating is not transmitted to the SOC 250 and the data for updating the AV engine or the firewall is transmitted to the SOC 250.

According to an exemplary embodiment, the data for updating transmitted from the update server 100 to the device may be transmitted to the SOC 250 directly. To achieve this, the SOC 250 may include an OTA interface (not shown) to receive the data for updating from the update server 100 in an OTA communication method or a network interface (not shown) to receive the data for updating from the update server 100 through a network.

According to an exemplary embodiment, the SOC 250 may include a separate processor such as a central processing unit (CPU) or a memory to perform a scanning operation to determine presence/absence of a virus or to perform a data filtering operation as described above. Alternatively, the SOC 250 may share a processor and/or a memory of the main module 200 to perform the above-described operations.

According to an exemplary embodiment, the system may further include a web server 50. The web server 50 may be a server which provides a variety of web services such as taxing, Internet banking, and on-line shopping to the device. In this case, the SOC 250 may apply a predetermined security policy to a data packet received through a network to perform the filtering operation.

According to an exemplary embodiment, the SOC 250 may pass only a data packet received from a specific server(s), while blocking a data packet received through the other servers. For example, the SOC 250 passes the data packet received from the update server 100 or the data packet received from the web server 50, while blocking the data packet received from the other servers.

In the present exemplary embodiment, any device that can mount the SOC 250 therein may be used as the device. For example, the device may be a computer, a cellular phone, a PDA, or a smart phone.

Figure 2:
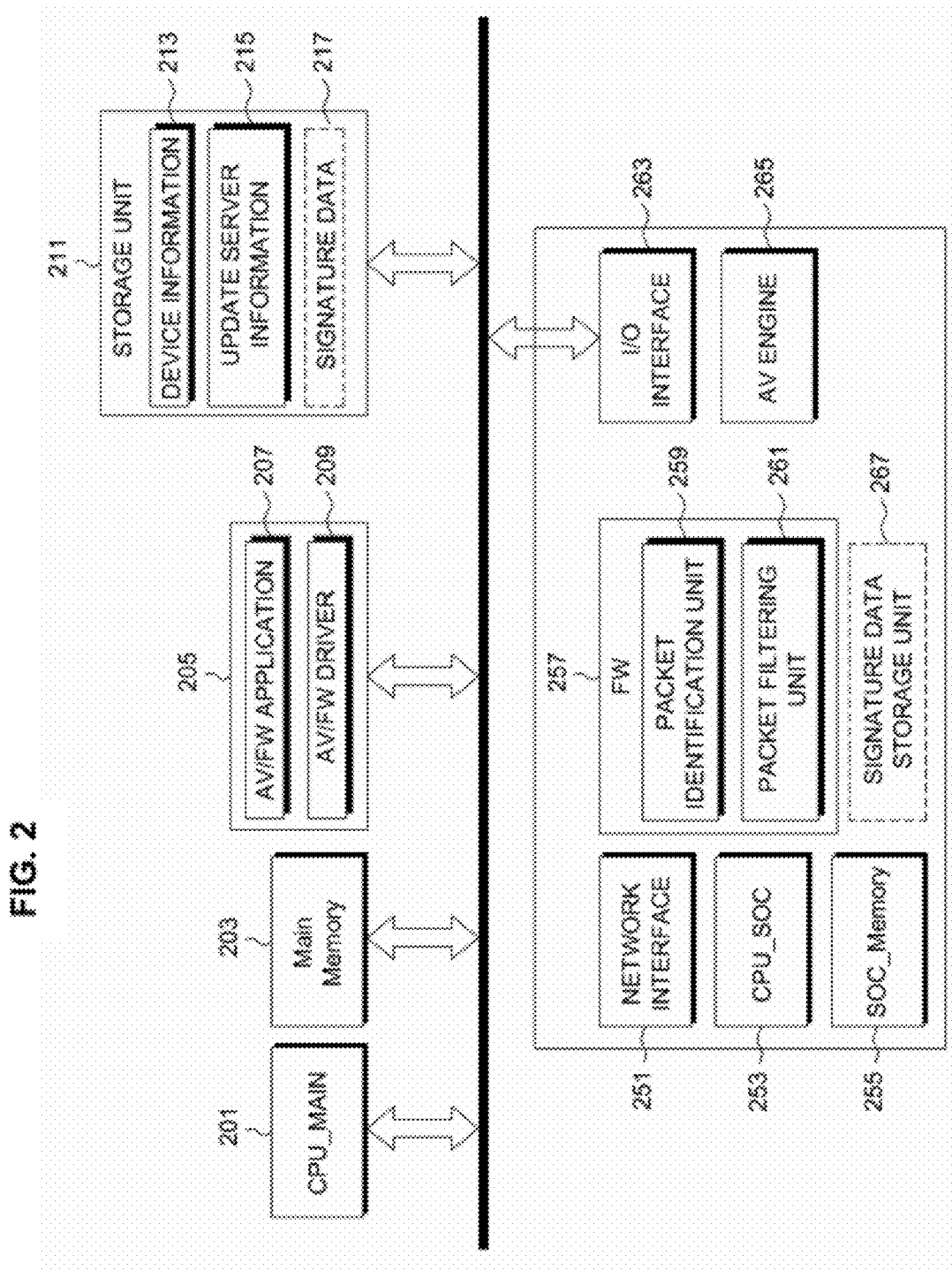
FIG. 2 is a block diagram illustrating a main board using a SOC for semiconductor intellectual property (IP) according to an exemplary embodiment.

FIG. 2 is a block diagram illustrating a main board using a SOC for semiconductor IP according to an exemplary embodiment.

Referring to FIG. 2, a main board using a SOC for semiconductor IP according to an exemplary embodiment includes a main module and a SOC for semiconductor IP.

The main module includes a main processor (CPU_MAIN) 201, a main memory 203, a user interface (UI) application unit 205, and a storage unit 211. The UI application unit 205 may include an AV/FW application 207 and an AV/FW driver 209, and the storage unit 211 may store device information 213 and update server information 215. Signature data 217 may be stored in the storage unit 211 or the SOC for semiconductor IP.

The SOC for semiconductor IP may include a network interface 251, a processor (CPU_SOC) 253, a SOC memory 255, a firewall (FW) 257, an input/output (I/O) interface 263, and an anti-virus (AV) engine 265. The firewall 257 may include a packet identification unit 259 and a packet filtering unit 261. A signature data storage unit 267 may be included in the SOC for semiconductor IP as an optional element or may be included in the main module as described above.

Hereinafter, an updating operation, a virus scanning operation, and a filtering operation will be explained in sequence with reference to FIG. 2.

Updating Operation

According to a pull method according to an exemplary embodiment, the AV/FW application 207 may request connection to an update server (for example, the update server 100 of FIG. 1) through the network interface 251. Information regarding the update server may be known by referring to the update server information 215 stored in the storage unit 211. The request may include the device information 213 such as information regarding the AV engine, the firewall and/or a current version of the signature data. The update server 100 may determine whether to transmit data for updating based on the device information 213. The firewall 257 may perform a filtering operation with respect to the connection request with reference to the server information.

The update server 100 transmits the data for updating to the network interface 251, and the data for updating is transmitted to the AV/FW application 207 through the firewall 257. After that, the AV/FW application 207 transmits the data for updating to the I/O interface 263, and the processor 253 (CPU_SOC) updates the firewall engine or the anti-virus engine or the signature data stored in the signature data storage unit 267 with the data for updating transmitted through the I/O interface 263. If the signature data is stored in the storage unit 211 of the main module rather than the signature data storage unit 267, the AV/FW application 207 may transmit only the data for updating the anti-virus engine or the firewall engine to the I/O interface 263.

Alternatively, the data for updating, which has been received by the network interface 251 at the request from the AV/FW application 207, passes through the firewall 257 and is directly used in the updating operation without being transmitted to the main module. In other words, if it is determined that a data packet passing through the firewall 257 is data for updating, the processor 253 may not transmit the data to the main module and directly updates the AV engine, the firewall engine, and/or the signature data. On the other hand, if it is determined that the data packet passing through the firewall 257 is not data for updating, the processor 253 may transmit the data to the main module through the network interface 251.

In the push method according to an exemplary embodiment, the update server (for example, the update server 100 of FIG. 1) may notify the AV/FW application 207 that the data for updating will be transmitted through the network interface 251. After that, the AV/FW application 207 transmits the data for updating received from the update server 100 to the I/O interface 263, and the processor 253 (CPU_SOC) updates the firewall engine or the anti-virus engine or the signature data stored in the signature data storage unit 267 with the data for updating transmitted through the I/O interface 263. If the signature data is stored in the storage unit 211 of the main module rather than the signature data storage unit 267, the AV/FW application 207 transmits only the data for updating the anti-virus engine or the firewall engine to the I/O interface 263 as described above.

Scanning Operation

According to an exemplary embodiment, the UI application unit 205 provides a screen for a user to input an instruction to perform a scanning operation. If an instruction to perform a scanning operation is input through this screen, the AV/FW application 207 transmits scanning data to the SOC through the AV/FW driver 209 as much as a predetermined amount. The I/O interface 263 receives the data through the AV/FW driver 209 and the AV engine 265 performs a scanning operation with respect to the scanning data received through the I/O interface 263.

Alternatively, the UI application unit 205 may be adapted to transmit the scanning data to the I/O interface 263 according to a predetermined scanning schedule. For example, the UI application unit 205 may provide a screen to receive a scanning schedule from a user and transmit the scanning data to the I/O interface 263 according to the scanning schedule input through the screen.

Alternatively, the UI application unit 205 may not receive a scanning schedule from the user and may transmit the scanning data according to a scanning schedule stored as a default or transmit the scanning data according to a scanning schedule received from an external server (e.g., an administrator server).

Filtering Operation

According to an exemplary embodiment, the firewall 257 may perform a filtering operation with respect to all of the data packets received or transmitted through the network interface 251. For example, the packet identification unit 259 identifies where the data packet comes from and goes to and the packet filtering unit 261 blocks or passes the data packet according to a predetermined filtering policy. According to an exemplary embodiment, the firewall 257 may perform the filtering operation with respect to all of the data transceived through the network interface 251.

According to an exemplary embodiment, the AV engine 265, the firewall 257, and an encryption and decryption engine (not shown), which will be described below, may be implemented by hardware and/or software. If at least some of the AV engine 265, the firewall 25, and the encryption and decryption engine are implemented by software, the element implemented by software may be loaded into the SOC memory 255 by the CPU 253. If at least some of the AV engine 265, the firewall 257, and the encryption and decryption engine (not shown) are implemented by software, the SOC may further include a program storage unit (not shown) such as a flash memory to store such software. In this case, the SOC may be adapted to share the CPU or the memory of the main module. This will be explained in detail below.

In the exemplary embodiment of FIG. 2, the data is transceived among the main module, the update server, and the SOC through a specific interface(s). However, this is merely an example and the data may be transceived in a different method within a limit without departing from the spirit of the present disclosure.

Figure 3:
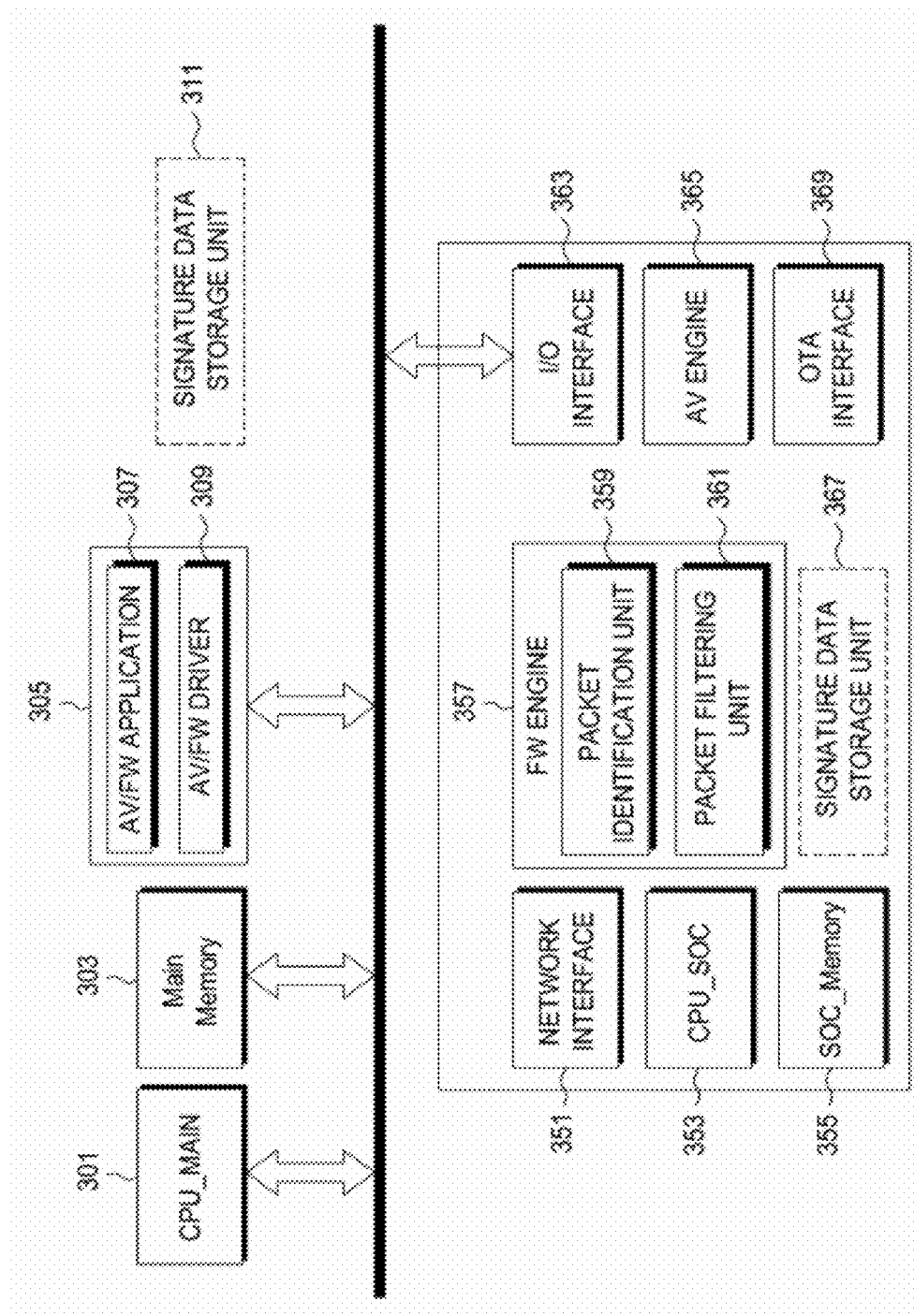
FIG. 3 is a block diagram illustrating a main board using a SOC for semiconductor IP according to another exemplary embodiment.

FIG. 3 is a block diagram illustrating a main board using a SOC for semiconductor IP according to another exemplary embodiment.

Referring to FIG. 3, a main board according to another exemplary embodiment includes a main module and a SOC for semiconductor IP. The exemplary embodiment of FIG. 3 differs from the exemplary embodiment of FIG. 2 in that the SOC includes an OTA interface 369.

The other elements of FIG. 3 except for the OTA interface 369 perform the same operations as those of FIG. 2 numbered in a similar way. Therefore, a detailed description thereof will be omitted. For example, a scanning operation of an AV engine 365, a filtering operation of a firewall 357, an operation of transmitting scanning data to the SOC by an UI application unit 305, and operations of interfaces 351, 363 are the same as those of the AV engine 265, the firewall 257, the UI application unit 205, and the interfaces 251, 263.

A difference between the exemplary embodiment of FIG. 2 and the exemplary embodiment of FIG. 3 will be mainly described. Referring to FIG. 3, the OTA interface 369 may directly receive data for updating from an update server (not shown) (for example, the update server 100 of FIG. 1). Using the data for updating received through the OTA interface 369, the FW engine 357 or the AV engine 365 stored in the SOC or signature data stored in a signature data storage unit 367 may be updated. For example, a processor 353 may perform the above-described updating operation using the data for updating received through the OTA interface 369.

According to an exemplary embodiment, the signature data may be stored in a storage unit 311 of the main module rather than the signature data storage unit 367. In this case, if the data for updating received through the OTA interface 369 is about signature data, the processor 353 may transmit the data for updating to the main module. After that, a processor 301 of the main module may update data pre-stored in the storage unit 311 with the data for updating the signature data. Alternatively, an element of the main module other than the processor 301, for example, an AV application 307, may store such data for updating the signature in the storage unit 311 and manage the data.

According to an exemplary embodiment, the firewall 357 may perform a filtering operation with respect to a data packet received from the OTA interface 369. The filtering operation of the firewall 357 is optional to a person who intends to embody the present disclosure, and the firewall 367 is not necessarily adapted to perform the filtering operation with respect to the data packet received from the OTA interface 269.

Figure 4:
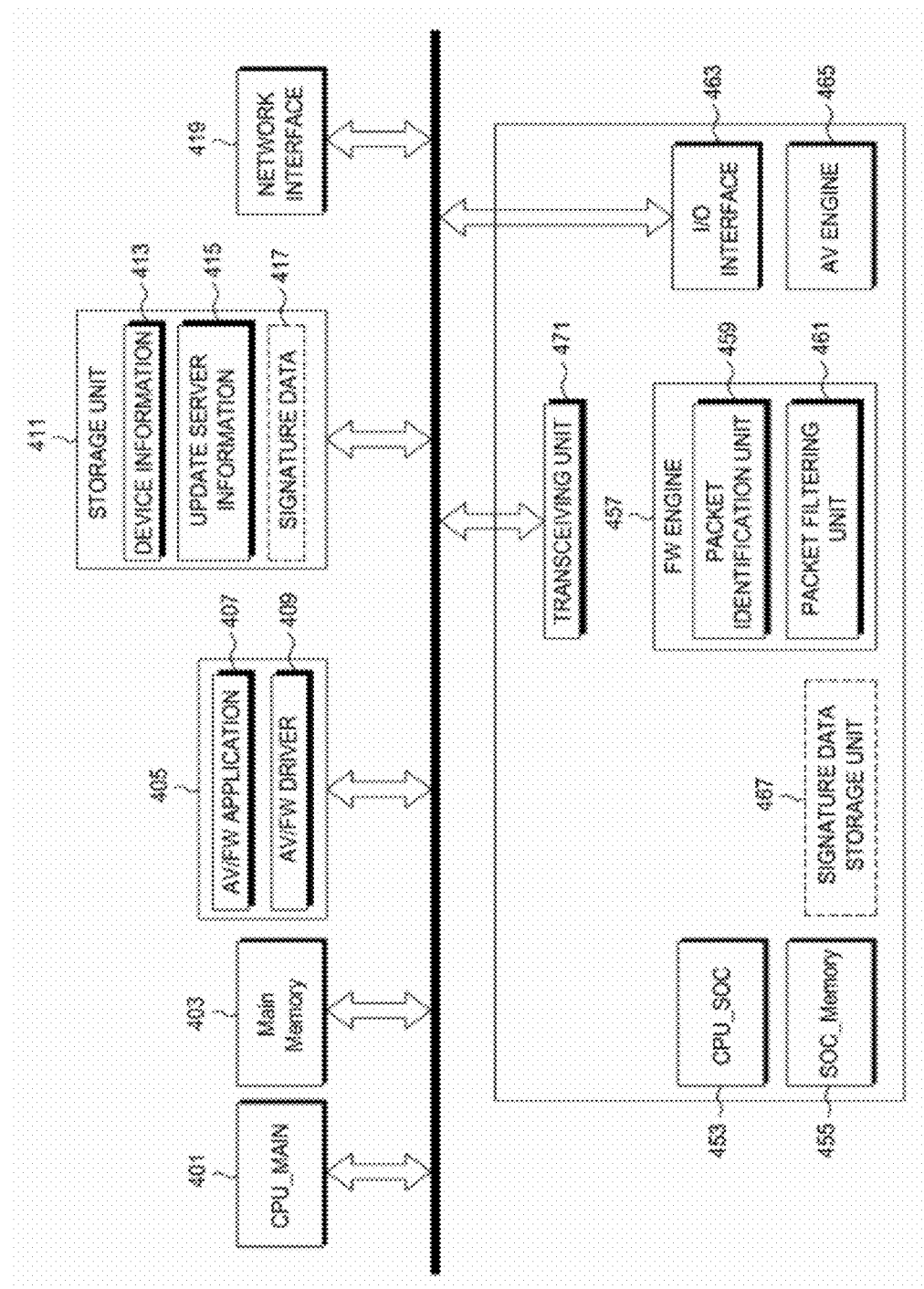
FIG. 4 is a block diagram illustrating a main board using a SOC for semiconductor IP according to still another exemplary embodiment.

FIG. 4 is a block diagram illustrating a main board using a SOC for semiconductor for IP according to still another exemplary embodiment.

Referring to FIG. 4, a main board according to still another exemplary embodiment includes a main module and a SOC for semiconductor IP. The exemplary embodiment of FIG. 4 differs from the exemplary embodiment of FIG. 2 in that the main module includes a network interface 419 and the SOC includes a transceiving unit 471 to communicate with the network interface 419. The other elements of FIG. 4 perform the same operations as those of FIG. 2 numbered in a similar way. For example, a scanning operation of an AV engine 465, a filtering operation of a firewall 457, and an operation of transmitting scanning data to the SOC by an UI application unit 405 are the same as those of the AV engine 265, the firewall 257, the UI application unit 205, and the interfaces 251, 263. Also, an updating operation in the exemplary embodiment of FIG. 4 may be the same as the updating operation of the pull or push method in the exemplary embodiment of FIG. 2.

A difference between the exemplary embodiment of FIG. 2 and the exemplary embodiment of FIG. 4 will be mainly described. Referring to FIG. 4, the SOC may communicate with an external source or receive data from the external source through the network interface 419 provided in the main module.

For example, data for updating is received through the network interface 419 and is controlled by an appropriate element (for example, a CPU_MAIN 401 or an AV/FW application 407) to be transmitted to the SOC. Data for updating signature data may be transmitted to the SOC or not according to whether the data for updating is stored in a storage unit 411 of the main module or a storage unit 467 of the SOC.

The transceiving unit 471 receives the data for updating from the main module and the firewall 457 performs a filtering operation with respect to the data for updating. After the filtering operation, pre-stored data is updated with the data for updating.

According to an exemplary embodiment, besides the data for updating, the other data may be received through the network interface 419 and transmitted to the SOC. After that, the data is filtered by the firewall 457 and then the filtered data is transmitted to the main module through the transceiving unit 471.

Figure 5:
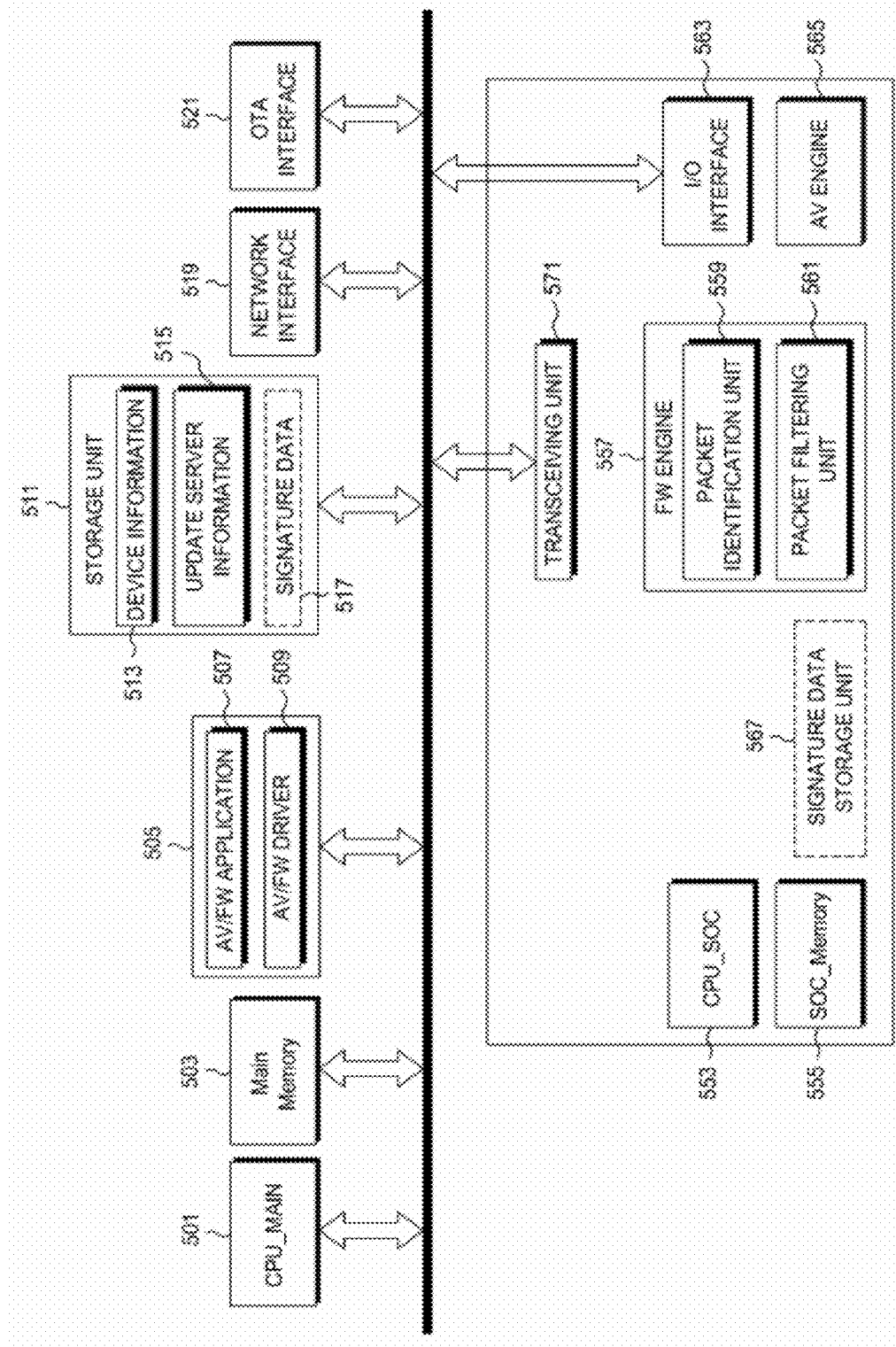
FIG. 5 is a block diagram illustrating a main board using a SOC for semiconductor IP according to still another exemplary embodiment.

FIG. 5 is a block diagram illustrating a main board using a SOC for semiconductor IP according to still another exemplary embodiment.

Referring to FIG. 5, a main board according to still another exemplary embodiment includes a main module and a SOC for semiconductor IP. The exemplary embodiment of FIG. 5 differs from the exemplary embodiment of FIG. 4 in that the main module further includes an OTA interface 521. The other elements of FIG. 5 except for the OTA interface 521 perform the same operations as those of FIG. 4 numbered in a similar way. For example, a scanning operation of an AV engine 565, a filtering operation of a firewall 557, and an operation of transmitting scanning data to the SOC by an UI application unit 505 are the same as those of the AV engine 465, the firewall 457, the UI application unit 405, and the interface 451, 463. Also, an updating operation in the embodiment of FIG. 5 may be the same as the updating operation of the pull or push method in the embodiment of FIG. 2.

A difference between the exemplary embodiment of FIG. 4 and the exemplary embodiment of FIG. 5 will be mainly described. The exemplary embodiment of FIG. 5 differs from the exemplary embodiment of FIG. 4 in that data for updating is received through the OTA interface 521. For example, the OTA interface 521 receives data for updating from an update server (for example, the update server 100 of FIG. 1), and the data for updating is transmitted to the SOC through an I/O interface 563 or a transceiving unit 571. If the data for updating is transmitted to the SOC through the I/O interface 563, the data for updating may not be filtered. If the data for updating is transmitted to the SOC through the transceiving unit 571, the data may be filtered by the firewall 557.

A data packet received through a network interface 519 may be transmitted from a predetermined server other than the update server. In this case, the data packet may be transmitted to the transceiving unit 571 of the SOC and filtered by the firewall 557.

In the present exemplary embodiment, the network interface 519 does not receive the data for updating. However, this is merely an example. The data for updating may be received by each of the network interface 519 and the OTA interface 521. In this case, the data for updating received through the network interface 519 may be transmitted to the transceiving unit 571 and filtered.

On the other hand, the data for updating received through the OTA interface 521 may be transmitted to the transceiving unit 571 or the I/O interface 563. If the transceiving unit 571 receives the data for updating, an updating operation is performed after the data is filtered by the firewall 557. If the I/O interface 563 receives the data for updating, an updating operation is performed without a filtering operation.

According to an exemplary embodiment, signature data may be stored in a storage unit 510 of the main module. In this case, if the OTA interface 521 receives data for updating signature data, the data is used for updating the signature data stored in the storage unit 510 without being transmitted to the SOC.

According to another exemplary embodiment, even if the OTA interface 521 receives the data for updating signature data, the filtering operation may be performed. In this case, the data for updating signature data is transmitted to the transceiving unit 571 of the SOC. The firewall 557 filters the data for updating signature data and retransmits the data for updating signature data to the main module through the transceiving unit 571. After that, the main module updates the signature data stored in the storage unit 511.

According to another exemplary embodiment, if the network interface 519 receives the data for updating signature data, the signature data stored in the storage unit 511 of the main module or a storage unit 567 of the SOC may be updated after a filtering operation of the firewall 557 for the data for updating signature data has been completed.

Figure 6:
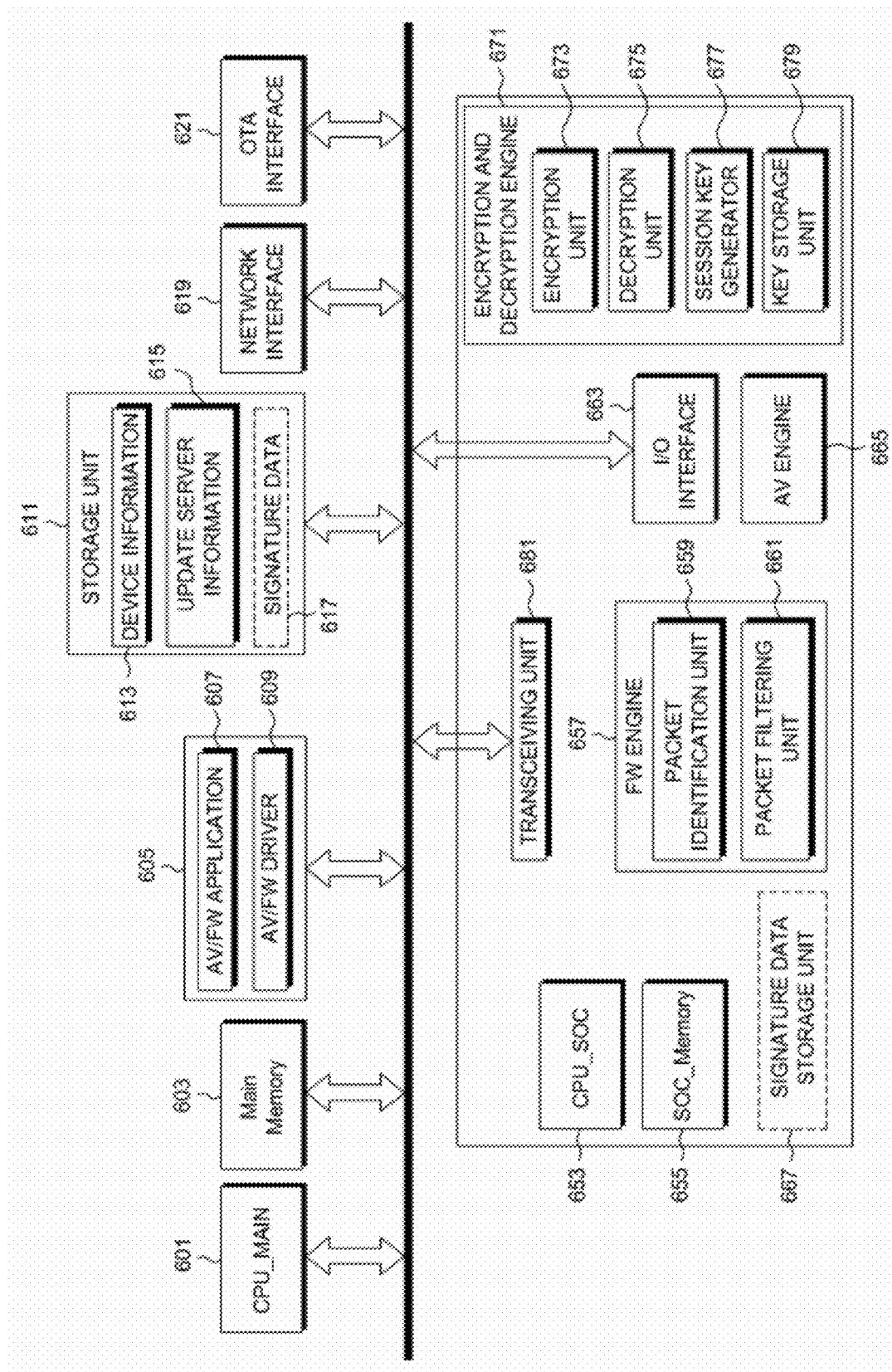
FIG. 6 is a block diagram illustrating a main board using a SOC for semiconductor IP according to still another exemplary embodiment.

FIG. 6 is a block diagram illustrating a main board using a SOC for semiconductor IP according to still another exemplary embodiment.

Referring to FIG. 6, a main board according to still another exemplary embodiment includes a main module and a SOC for semiconductor IP. The exemplary embodiment of FIG. 6 differs from the exemplary embodiment of FIG. 5 in that the SOC further includes an encryption and decryption engine 671. The other elements of FIG. 6 except for the encryption and decryption engine 671 perform the same operations as those of FIG. 5 numbered in a similar way and thus a detailed description thereof will be omitted. For example, a scanning operation of an AV engine 665, a filtering operation of a firewall 657, and an operation of transmitting scanning data to the SOC by an UI application unit 605 may be the same as those of the AV engine 565, the firewall 557, the UI application unit 505, and the interfaces 551, 563. Also, an updating operation in the exemplary embodiment of FIG. 6 may be the same as the updating operation of the pull or push method in the exemplary embodiment of FIG. 2.

A difference between the exemplary embodiment of FIG. 5 and the exemplary embodiment of FIG. 6 will be mainly described. The exemplary embodiment of FIG. 6 differs from the aforementioned exemplary embodiments in that encrypted data for updating is transmitted from a server.

First, a case in which data for updating is received in the pull method will be explained with reference to FIG. 6. An AV/FW application 607 transmits a request for connection to an update server (for example, the server 100 of FIG. 1). The update server 100 transmits a public key which has been already generated along with a secret key. The public key transmitted from the server 100 passes through the firewall 657 of the SOC and is transmitted to the encryption and decryption engine 671. The encryption and decryption engine 671 stores the public key in a key storage unit 669. A key generator 677 of the encryption and decryption engine 671 generates a key used for each network session and stores the session key in the key storage unit 669. The encryption and decryption engine 671 encrypts the session key using the public key stored in the key storage unit 669. After that, the SOC transmits the encrypted session key and information regarding an encryption algorithm to the update server 100 (the information regarding the encryption algorithm may be encrypted with the public key). For example, the encrypted session key and the encryption algorithm information are transmitted to the AV/FW application 607 through an I/O interface 663, and the AV/FW application 607 transmits the encrypted session key and the encryption algorithm information to the update server 100 through a network interface 619.

The update server 100 decrypts the encrypted session key using the secret key which is paired with the public key distributed to the device, and selects an encryption algorithm using the encryption algorithm information. The update server 100 encrypts data for updating using the session key according to the selected encryption algorithm and transmits the encrypted data to the main module. In the present exemplary embodiment, the encryption algorithm information is transmitted to the server 100 without being encrypted. However, both the encryption algorithm information and the session key may be encrypted with the public key and transmitted to the server 100.

For example, the AV/FW application 607 may transmit the encrypted data for updating, which has been received from the update server 100, to the encryption and decryption engine 671 through the I/O interface 663. A decryption unit 675 of the encryption and decryption engine 671 decrypts the encrypted data using the session key stored in the key storage unit 669. After that, pre-stored data may be updated with the decrypted data for updating.

Also, the AV/FW application 607 may transmit the encrypted data for updating, which has been received from the update server 100, to the firewall 657 through a transceiving unit 681. Then, if a filtering operation is completed by the firewall 657, the data for updating is transmitted to the encryption and decryption engine 671. The decryption unit 675 of the encryption and decryption engine 671 decrypts the encrypted data for updating using the session key stored in the key storage unit 669. After that, pre-stored data may be updated with the decrypted data for updating.

The public key of the update server, the encrypted session key or the encryption algorithm information, and the encrypted data for updating may be transmitted or received through an OTA interface 621 or a network interface 619. In this case, the firewall 657 may be adapted to pass the public key, the encrypted session key or the encryption algorithm information, and the encrypted data for updating there through or not.

Next, a case in which encrypted data for updating is received in the pull method will be explained with reference to FIG. 6. The update server (for example, the server 100 of FIG. 1) requests connection to the AV/FW application 607 according to its own update schedule. Next, in the same process as in the above-described pull method, encrypted data for updating is decrypted and data is updated.

According to an exemplary embodiment, signature data may be stored in and managed by a storage unit 611 of the main module. In this case, signature data for updating which has been decrypted by the decryption unit 675 is transmitted to the main module through the I/O interface 663. The main module updates the signature data stored in the storage unit 611 with the received signature data for updating.

According to another exemplary embodiment, the signature data may be stored in and managed by a storage unit 667 of the SOC. In this case, the signature data stored in the storage unit 667 may be updated with signature data for updating which has been decrypted by the decryption unit 675.

In the exemplary embodiment of FIG. 6, the session key is encrypted in the asymmetric key encryption scheme, whereas the data for updating is encrypted in the symmetric key encryption scheme. However, this is merely an example. Only one of the asymmetric key encryption scheme and the symmetric key encryption scheme may be used. Alternatively, the session key is transmitted in the symmetric key encryption scheme, whereas the data for updating is transmitted in the asymmetric key encryption scheme.

Also, in FIG. 6, the process of encrypting and decryption the data for updating has been described. However, the present disclosure is applicable to other data that needs to be encrypted within a limit without departing the spirit of the present disclosure.

Figure 7:
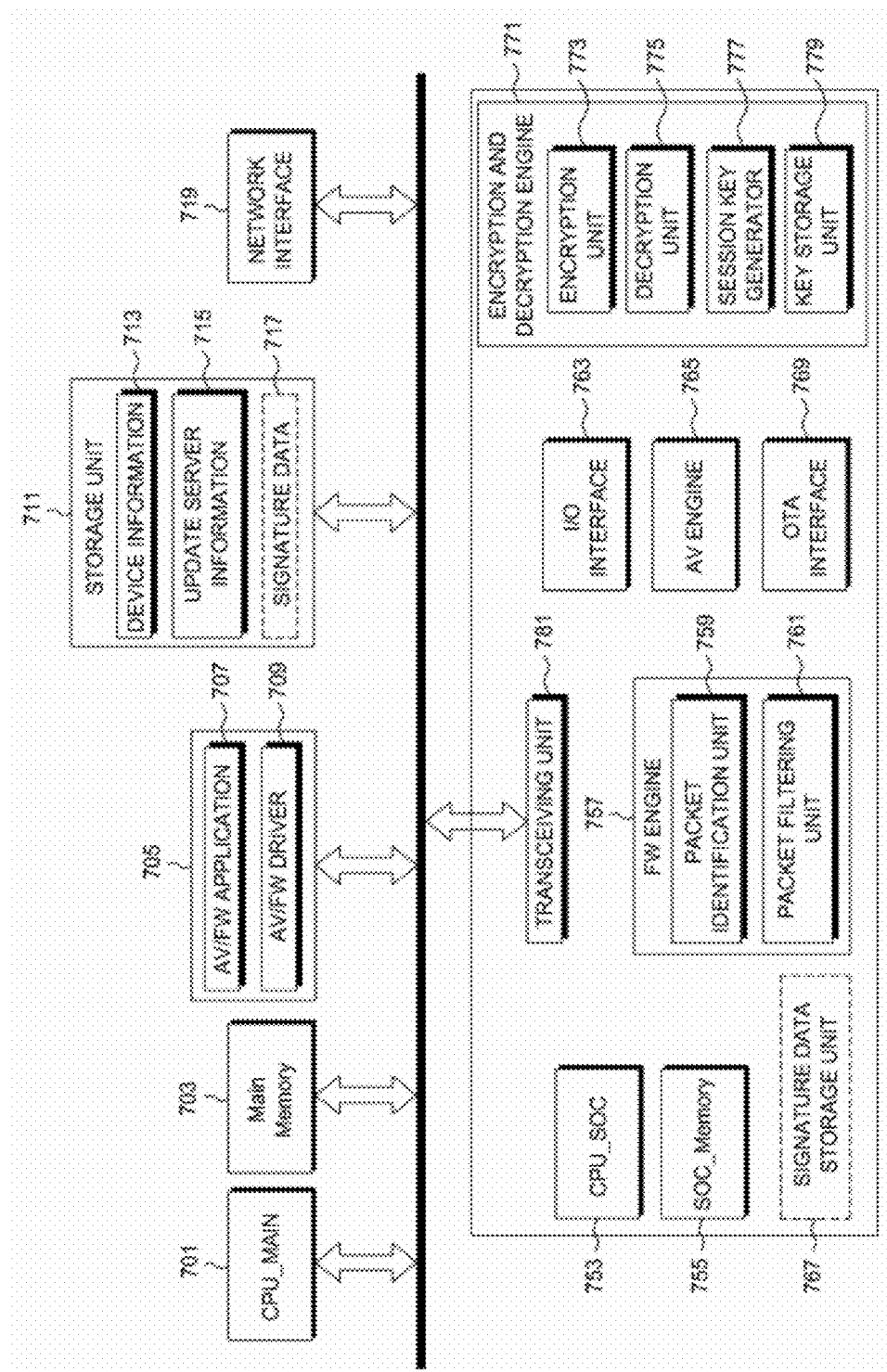
FIG. 7 is a block diagram illustrating a main board using a SOC for semiconductor IP according to still another exemplary embodiment.

FIG. 7 is a block diagram illustrating a main board using a SOC for semiconductor IP according to still another exemplary embodiment.

Referring to FIG. 7, a main board using a SOC for semiconductor IP according to still another exemplary embodiment includes a main module and a SOC for semiconductor IP. The exemplary embodiment of FIG. 7 differs from the exemplary embodiment of FIG. 6 in that an OTA interface 769 is included in the SOC rather than the main module. The other elements of FIG. 7 may perform the same operations as those of FIG. 6 numbered in a similar way. For example, a scanning operation of an AV engine 765, a filtering operation of a firewall 757, and an operation of transmitting scanning data to the SOC by an UI application unit 705 may be the same as those of the AV engine 665, the firewall 657, the UI application unit 605, and the interfaces 651, 663. Also, an updating operation in the embodiment of FIG. 7 may be the same as the updating operation of the pull or push method in the embodiment of FIG. 2.

A difference between the exemplary embodiment of FIG. 6 and the exemplary embodiment of FIG. 7 will be mainly described. The exemplary embodiment of FIG. 7 differs from the exemplary embodiment of FIG. 6 in that the SOC directly receives encrypted data for updating from a server through the OTA interface 769. A process of receiving the encrypted data for updating through a network interface 719 may be the same as in the exemplary embodiment of FIG. 6.

According to an exemplary embodiment, an encryption and decryption engine 771 may be adapted to transmit or receive a public key, a session key encrypted with the public key, and encryption algorithm information through a network interface 719, while receiving data for updating encrypted with the session key through the OTA interface 769. Meanwhile, a process of receiving the public key from a server 10 and transmitting the encrypted session key and the encryption algorithm information to the server 10 may be the same as in the aforementioned exemplary embodiments.

According to another exemplary embodiment, the encryption and decryption engine 771 may be adapted to transmit or receive the public key, the session key encrypted with the public key, the encryption algorithm information, and the data for updating encrypted with the session key through only the OTA interface 769.

Figure 8:
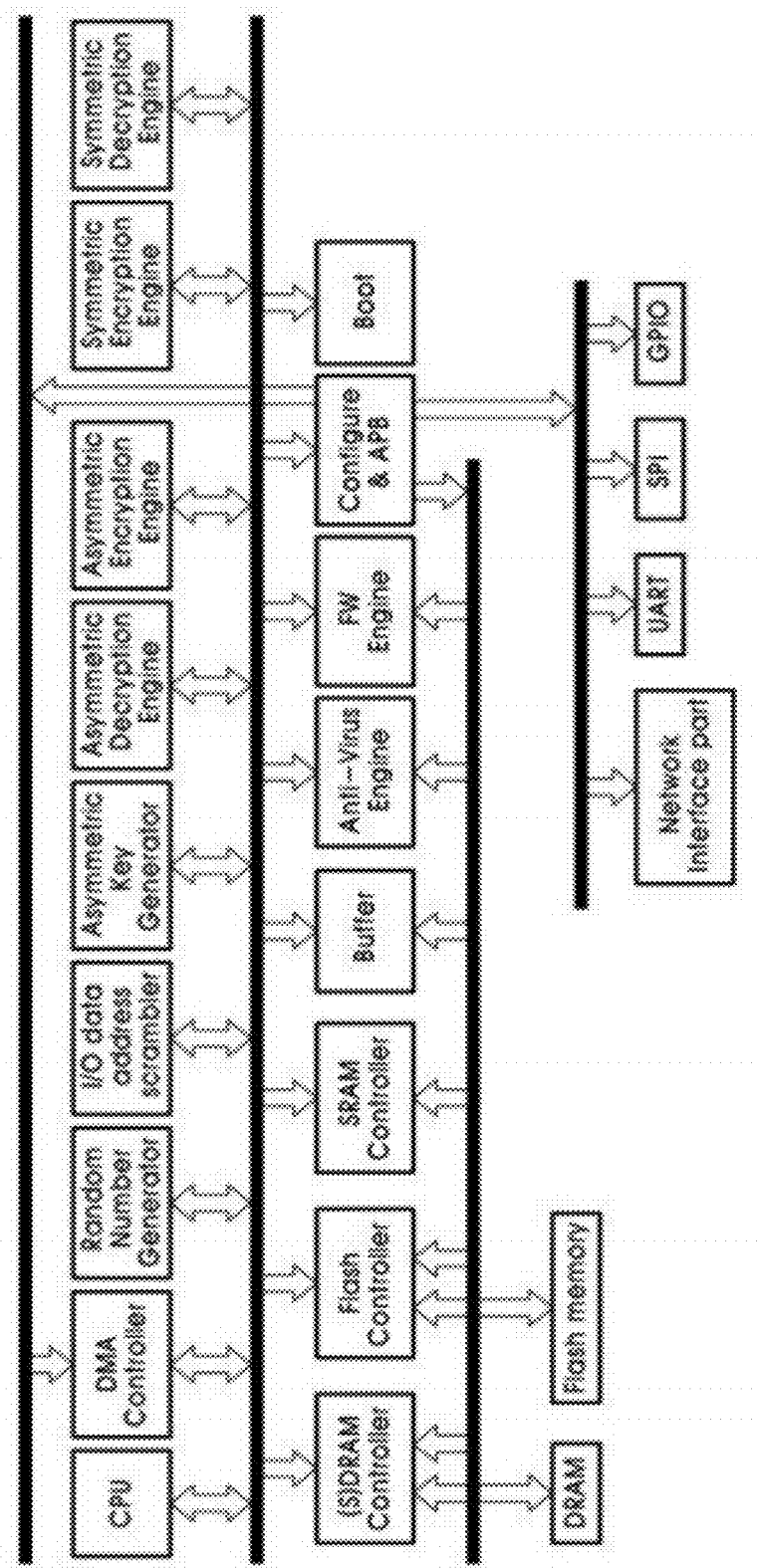
FIG. 8 is a block diagram illustrating a SOC according to an exemplary embodiment.

FIG. 8 is a block diagram illustrating a SOC according to an exemplary embodiment.

Referring to FIG. 8, a SOC according to an exemplary embodiment includes a processor (CPU), a direct memory access (DMA) controller, a random number generator, an input/output (I/O) data address scrambler, an asymmetric key generator, an asymmetric decryption engine, an asymmetric encryption engine, a symmetric decryption engine, a symmetric encryption engine, a (synchronous) dynamic random access memory ((S)DRAM) controller, a flash controller, a static random access memory (SRAM) controller, a buffer, an anti-virus engine, a firewall engine, a configure and APB, a boot, a dynamic random access memory (DRAM), a flash memory, a network interface, an universal asynchronous receiver/transmitter (UART), a serial peripheral interface (SPI), and a general purpose input/output (GPIO).

In the present exemplary embodiment, the processor (CPU) performs the same operation as that of the CPU_SOC included in the SOC described in the embodiments of FIGS. 2 to 7. The random number generator, the I/O data address scrambler, the asymmetric key generator, the asymmetric decryption engine, the symmetric decryption engine, and the symmetric encryption engine may perform the same operation as that of the encryption and decryption engine in the exemplary embodiments of FIGS. 6 and 7. For example, the random number generator, which corresponds to the key generator of FIGS. 6 and 7, may generate a session key. The asymmetric encryption engine may encrypt the session key generated by the random number generator with an already distributed public key and encrypt a symmetric key encryption algorithm with the public key. After that, the encrypted session key and information regarding the symmetric key encryption algorithm are transmitted to an external server through a network interface. The external server (for example, the update server) decrypts the session key with a secret key which is paired with the public key, selects an algorithm to encrypt using the information regarding the encryption algorithm, and encrypts data to be transmitted using the selected encryption algorithm and the session key.

The data received through the network interface is data that has been encrypted by the symmetric key encryption algorithm, and may be decrypted by the symmetric decryption engine using the session key.

According to an exemplary embodiment, data for updating may be encrypted or decrypted in various combinations of the symmetric key encryption algorithm and the asymmetric key encryption algorithm, and the symmetric encryption engine, the asymmetric key generator, and the asymmetric decryption engine may perform encrypting and decrypting operations in such various combinations. The I/O data address scrambler illustrated in FIG. 8 may operate to prevent an information provider (IP) from being fabricated by hacking.

The (S)DRAM controller, the flash controller, and the SRAM controller may control the DRAM, the flash memory, and the buffer, respectively.

The boot may load a system program into the DRAM to drive the SOC when power is supplied to the SOC. If the system program is loaded into the DRAM, the SOC is driven by the system program.

The configure and APB may perform configuration with respect to the SOC.

The anti-virus engine and the firewall engine of FIG. 8 may perform corresponding operations of the anti-virus engine and the firewall of FIGS. 2 to 7. For example, the anti-virus engine of FIG. 8 includes scanning data and signature data and determines whether there is a virus or not, and the FW engine filters a data packet transceived through the network interface according to a predetermined security policy.

According to an exemplary embodiment, the anti-virus engine and the FW engine may be implemented by software. In this case, the anti-virus engine and the FW engine may be stored in the flash memory and loaded into the DRAM by the processor (CPU). In the present exemplary embodiment, the flash memory may store signature data. The signature data stored in the flash memory is loaded into the DRAM as much as a predetermined amount and is used in a scanning operation.

According to another exemplary embodiment, the anti-virus engine and the FW engine of FIG. 8 may be implemented by hardware and software. For example, the anti-virus engine may be implemented by hardware and software. A software part of the anti-virus engine is stored in the flash memory and loaded into the DRAM by the processor (CPU) to perform a scanning operation along with a hardware part of the anti-virus engine. Also, a software part of the FW engine is stored in the flash memory and is loaded into the DRAM by the processor (CPU) to perform a filtering operation along with a hardware part of the FW engine.

According to an exemplary embodiment, the signature data may be stored in the main module (not shown) rather than the flash memory and loaded into the DRAM of the SOC when a scanning operation is performed. In the present exemplary embodiment, the UART, the SPI, and the GPIO may provide a communication interface to communicate with the main module and/or an external device.

In the exemplary embodiment of FIG. 8, the SOC includes the CPU and the DRAM. However, the SOC may share a CPU and a DRAM of the main module. For example, if the SOC shares the CPU of the main module, the CPU of the main module drives the anti-virus engine to perform the scanning operation.

On the other hand, if the SOC shares the DRAM of the main module, the anti-virus engine is loaded into the DRAM of the main module and is driven. In this case, both the signature data and the scanning data may be loaded into the DRAM of the main module for the scanning operation.

Figure 9:
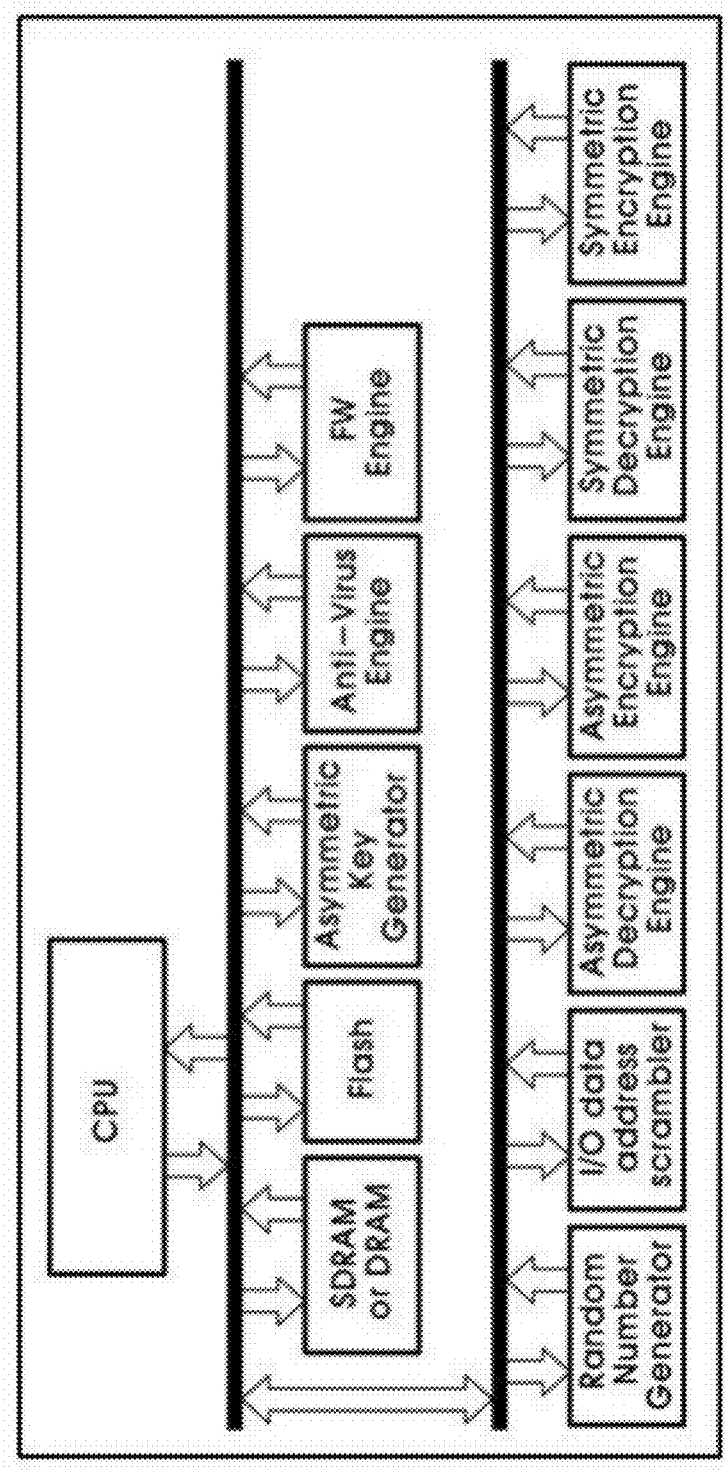
FIG. 9 is a block diagram illustrating a SOC for semiconductor IP according to an exemplary embodiment.

FIG. 9 is a block diagram illustrating a SOC for semiconductor IP according to an exemplary embodiment.

Referring to FIG. 9, a SOC for semiconductor IP according to an exemplary embodiment includes a processor (CPU), an SDRAM (or DRAM), a flash memory, an asymmetric key generator, an anti-virus engine, an FW engine, a random number generator, an I/O data address scrambler, an asymmetric decryption engine, an asymmetric encryption engine, a symmetric decryption engine, and a symmetric encryption engine.

The asymmetric key generator, the anti-virus engine, the FW engine, the random number generator, the I/O data address scrambler, the asymmetric decryption engine, the symmetric decryption engine, the symmetric encryption engine, and the asymmetric encryption engine (not shown) of FIG. 9 may perform the above-described encrypting and decrypting operation. The operations of these elements have been described with reference to FIG. 8.

In the exemplary embodiment of FIG. 9, a part of the anti-virus engine may be implemented by hardware and the remaining part may be implemented by software to drive the hardware. The software is stored in the flash memory and is loaded into the SRAM for the scanning operation. Signature data and scanning data are loaded into the SDRAM.

In the exemplary embodiment of FIG. 9, the anti-virus engine may be implemented by software only. In this case, the anti-virus engine is stored in the flash memory and loaded into the SDRAM by the CPU for the scanning operation.

In the exemplary embodiment of FIG. 9, at least a part of the FW engine may be implemented by software. The software part of the FW engine is stored in the flash memory and loaded into the SDRAM by the CPU.

In the exemplary embodiment of FIG. 9, the flash memory may store the anti-virus engine implemented by software, the firewall implemented by software, and the signature data.

According to another exemplary embodiment, the main module and the SOC for semiconductor IP may share a CPU or an SDRAM. If the main module and the SOC share the CPU, the CPU of the main module may load the anti-virus engine and/or the FW engine of the SOC into the DRAM to perform the scanning operation. If the main module and the SOC share the DRAM, the CPU of the SOC may load the anti-virus engine and/or the FW engine of the SOC into the common DRAM to perform the scanning operation or the filtering operation. In either case, signature data and scanning data of a predetermined size may be loaded into the DRAM.

Figure 10:
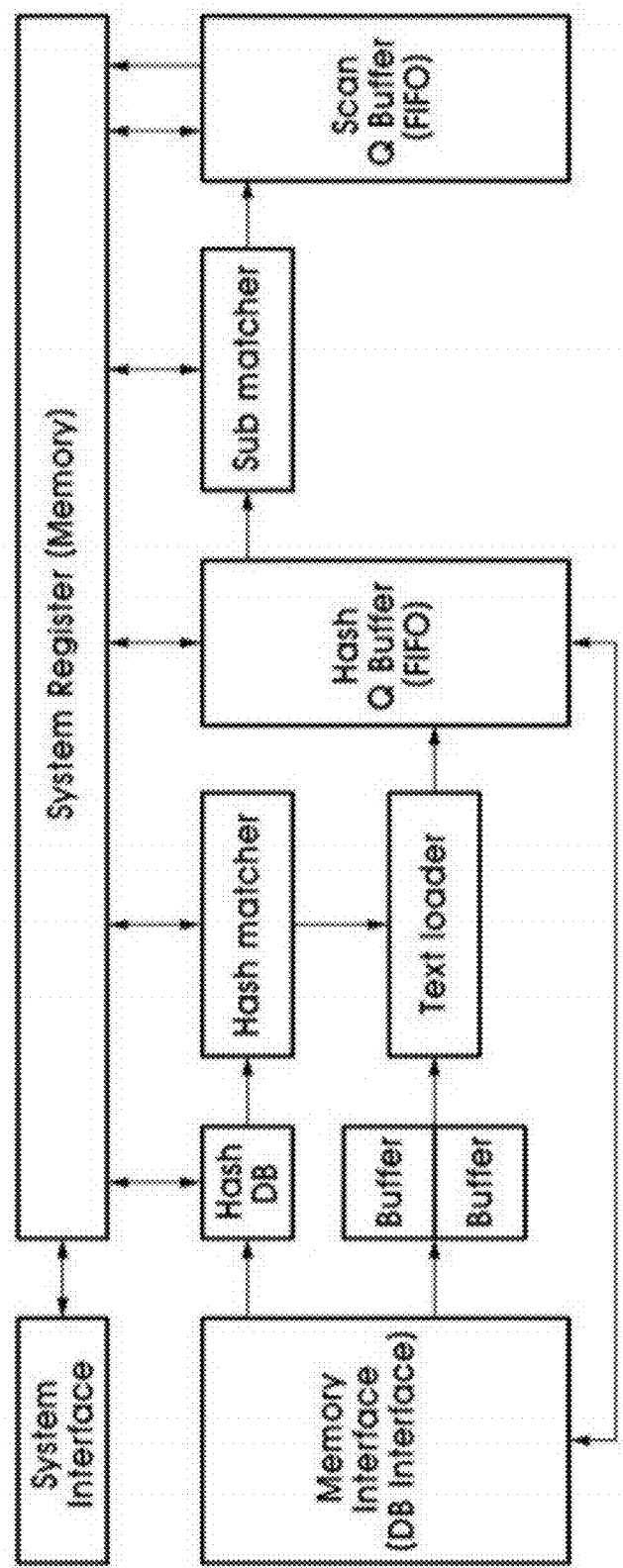
FIG. 10 is a block diagram illustrating a hardware part of an anti-virus engine according to an exemplary embodiment.

FIG. 10 is a block diagram illustrating a hardware logic part of an anti-virus engine according to an exemplary embodiment.

Referring to FIG. 10, a hardware logic part of an anti-virus engine according to an exemplary embodiment includes a system register, a system interface, a memory interface, a hash database (DB), a buffer, a hash matcher, a text loader, a hash Q buffer, a sub-matcher, and a scan Q buffer.

According to the exemplary embodiment of FIG. 10, the system interface may control an operation of the anti-virus engine through a bus interface. For example, the system interface may control the operation of the anti-virus engine through a bus interface of an AMBA 2.0 protocol. Also, if a SOC is a SOC for semiconductor IP, the system interface may control the operation of the anti-virus engine through an AXI bus interface, for example.

According to the exemplary embodiment of FIG. 10, the system register may include a register to grasp an operation status of the anti-virus engine or indicate a status of each buffer or an interrupt status.

According to the exemplary embodiment of FIG. 10, in order to improve a performance of the anti-virus engine, a system information part, which corresponds to a configuration part of a register area to control the operation of the anti-virus engine, and a data path to process data at high speed may be divided into different ports. Also, a reading-out operation (matcher engine) and a writing operation (system or DRAM) are separately performed so that a DB interface part can control the reading-out operation and the writing operation without using a dual port memory.

Figure 11:
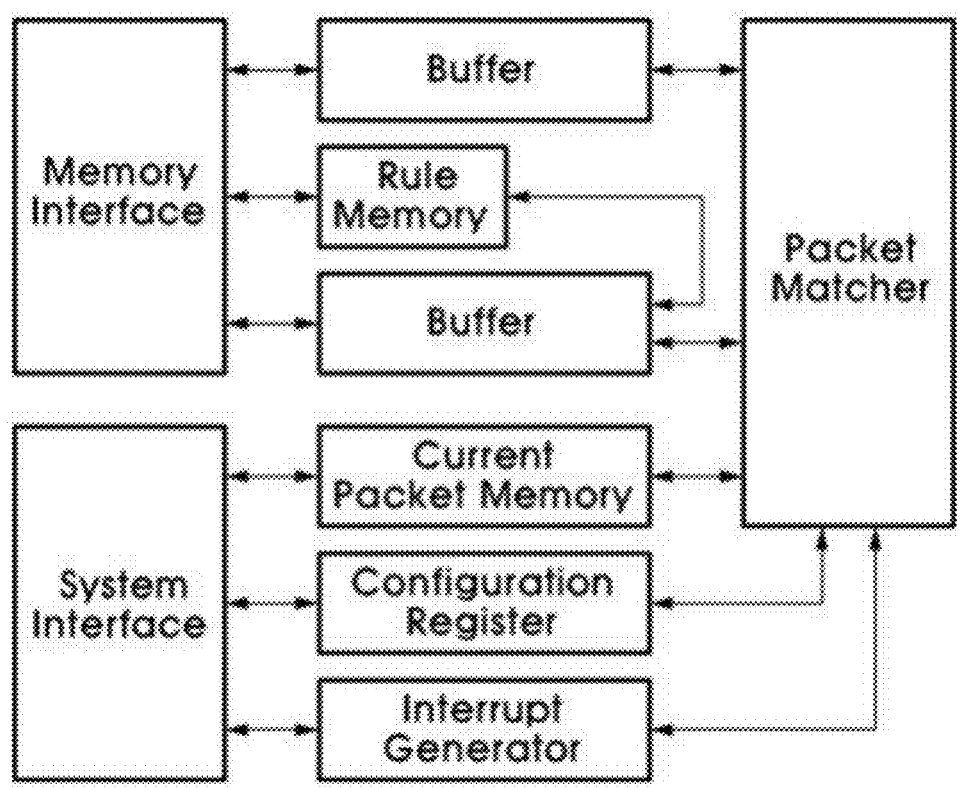
FIG. 11 is a block diagram illustrating a hardware part of a firewall according to an exemplary embodiment.

FIG. 11 is a block diagram illustrating a hardware logic part of a firewall according to an exemplary embodiment. Referring to FIG. 11, a hardware logic part of a firewall according to an exemplary embodiment includes a memory interface, a system interface, buffers, a rule memory, a current packet memory, a configuration register, an interrupt generator, and a packet matcher.

According to the exemplary embodiment of FIG. 11, the memory interface may have an ahb2mem block, which may operate to convert an AMBA (2.0) bus standard into a memory interface standard.

According to the exemplary embodiment of FIG. 11, in order to compare a current packet received through a Network Interface Card (NIC) and a rule or an internal rule stored in an external memory, speed of both of the current packet and the rule may be controlled. To achieve this, a FIFO buffer may be used. In other words, rule data read-out from the external memory may be input to the FIFO buffer.

According to the exemplary embodiment of FIG. 11, the rule memory may be a register block that is used to categorize the rule based on a sum value of effective bytes in the current packet and to reduce the frequency of connection of the external memory.

According to the exemplary embodiment of FIG. 11, the data packet transmitted through the NIC is stored in a predetermined position of the SDRAM, and it is determined whether the packet is processed or not according to a result of data filtering. In this case, a large amount of data is processed in the data path of the SDRAM, so a buffer may be needed.

Figure 12:
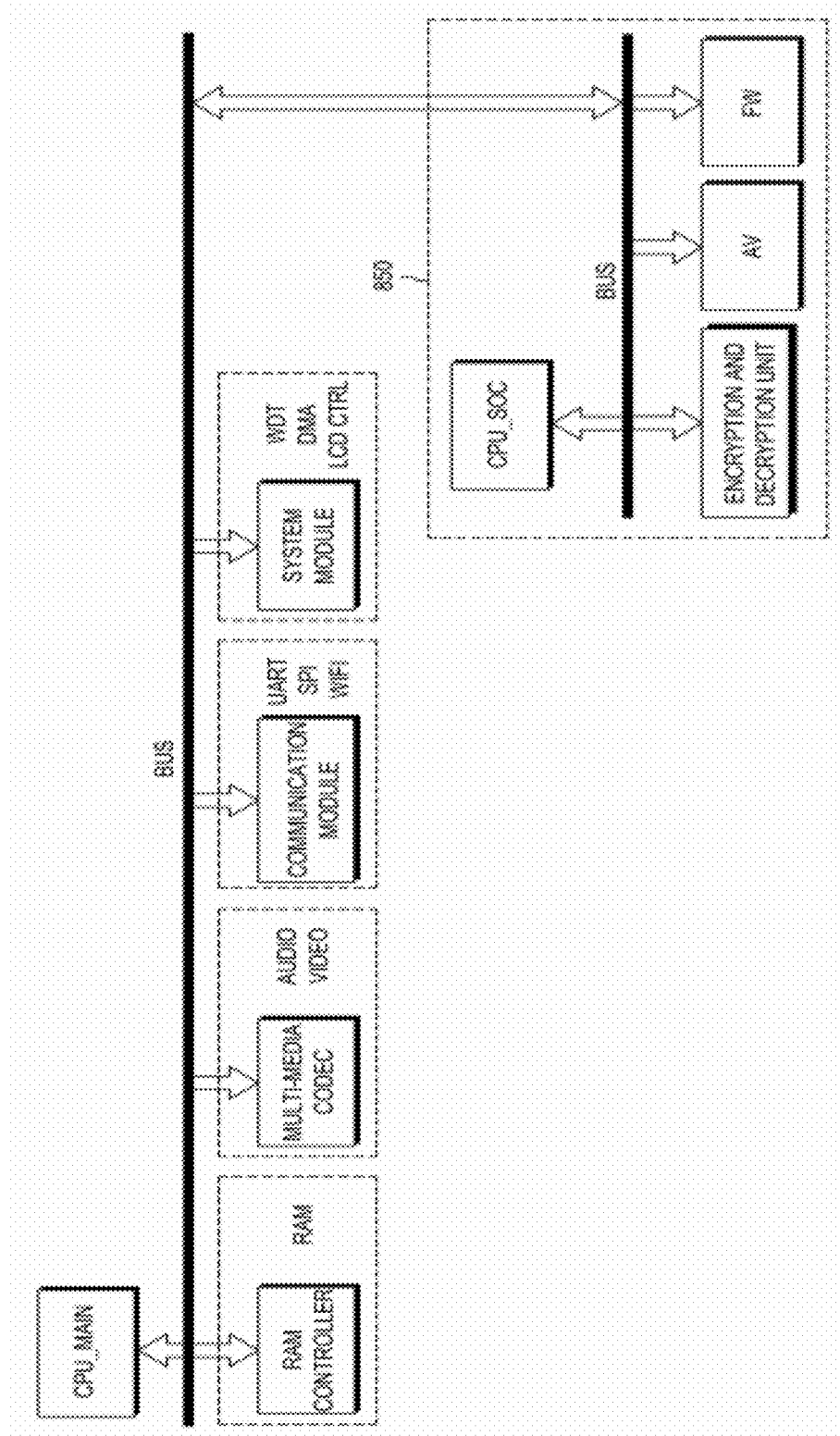
FIG. 12 is a view illustrating an example of a SOC for semiconductor IP mounted on a main board according to an exemplary embodiment.

FIG. 12 is a view illustrating an example of a SOC for semiconductor IP mounted on a main board according to an exemplary embodiment.

According to the exemplary embodiment of FIG. 12, a SOC 850 for semiconductor IP may include a dedicated CPU (CPU_SOC) and may not share a CPU (CPU_MAIN) of a main module.

According to the exemplary embodiment of FIG. 12, the SOC 850 may share an SRAM of the main module. In this case, scanning data and signature data are loaded into the SRAM of the main module, and an encryption and decryption unit, an AV, and/or a FW which are implemented by software in the SOC 850 are loaded into the SRAM of the main module to perform their respective operations.

Figure 13:
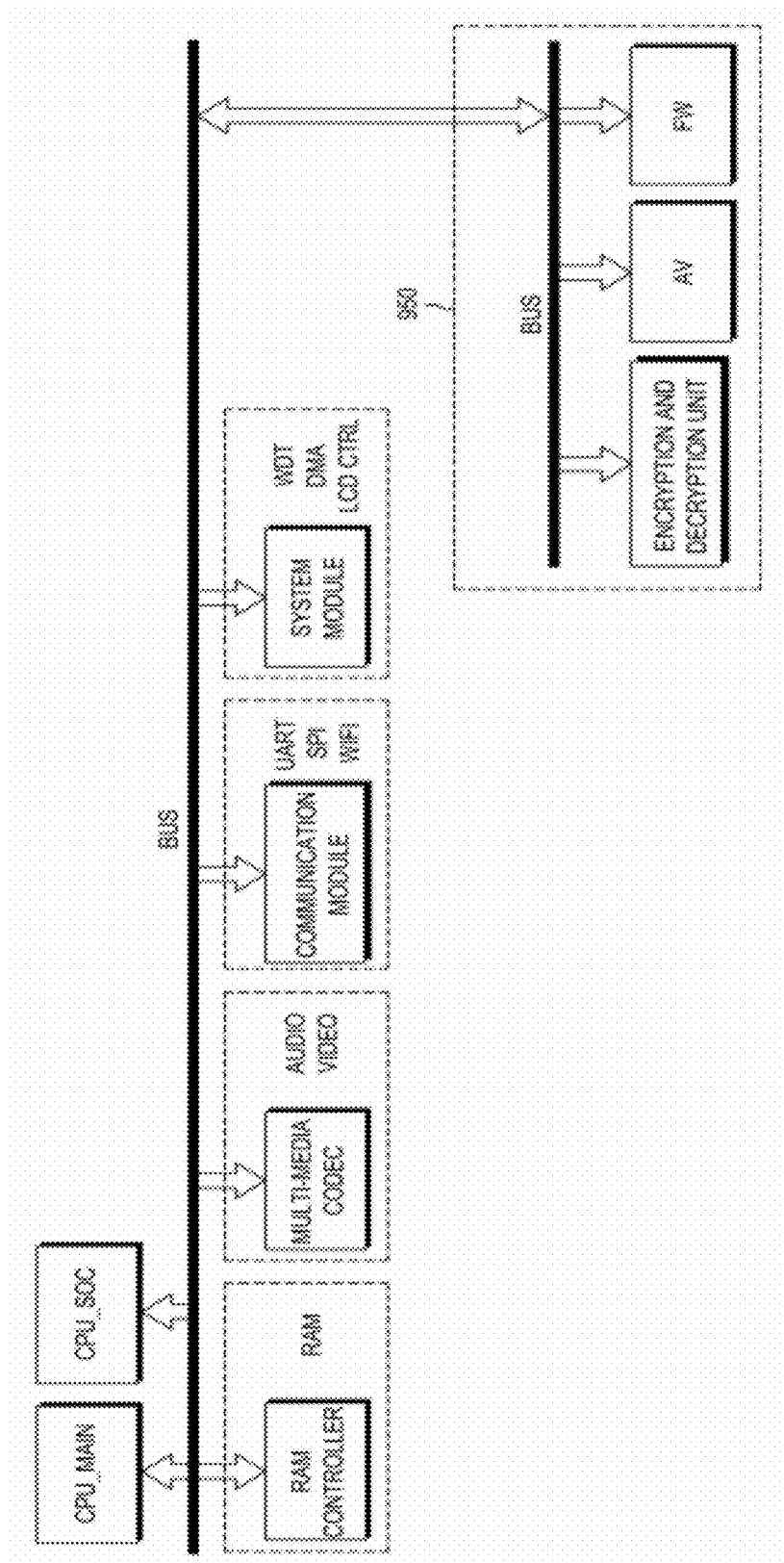
FIG. 13 is a view illustrating an example of a SOC for semiconductor IP mounted on a main board according to another exemplary embodiment.

FIG. 13 is a view illustrating an example of a SOC for semiconductor IP mounted on a main board according to another exemplary embodiment.

According to the exemplary embodiment of FIG. 13, a SOC 950 for semiconductor IP may use one of at least two CPUs included in a main module. For example, the SOC 950 uses a CPU (CPU_SOC) included in the main module and does not use another CPU (CPU_MAIN) of the main module. Even if a single CPU is provided in the main module but it supports a multi-processing function (multi-processor), the SOC 850 can use some of resources of the multi-processor dedicatedly.

In the present exemplary embodiment, the SOC may be adapted to use the CPU and the memory of the main module. In this case, scanning data and signature data are loaded into an SRAM of the main module, and an encryption and decryption unit, an AV, and an FW implemented by software in the SOC 850 are also loaded into the SRAM of the main module to perform their respective operations.

Figure 14:
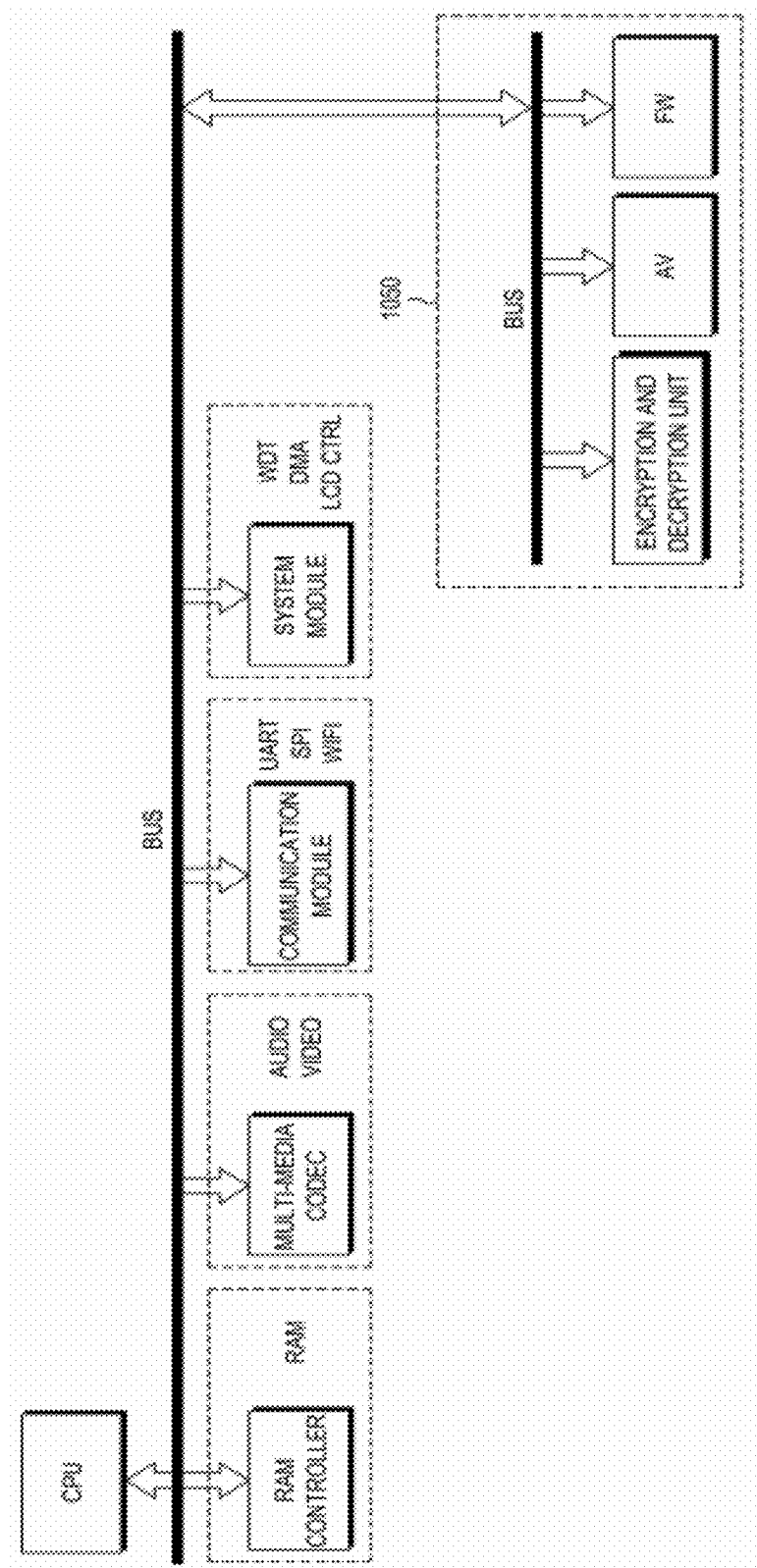
FIG. 14 is a view illustrating an example of a SoC for semiconductor IP mounted on a main board according to still another exemplary embodiment.

FIG. 14 is a view illustrating an example of a SOC for semiconductor IP mounted on a main board according to still another exemplary embodiment.

According to the exemplary embodiment of FIG. 14, a SOC 1050 for semiconductor IP may share a dedicated CPU and an SDRAM of a main module.

In the present exemplary embodiment, the SOC 1050 may be adapted to share both the CPU and the memory with the main module. In this case, scanning data and signature data are loaded into the SDRAM of the main module, and an encryption and decryption unit, an AV, and/or an FW implemented by software in the SOC 1050 are loaded into the SDRAM to perform their respective operations.

Figure 15:
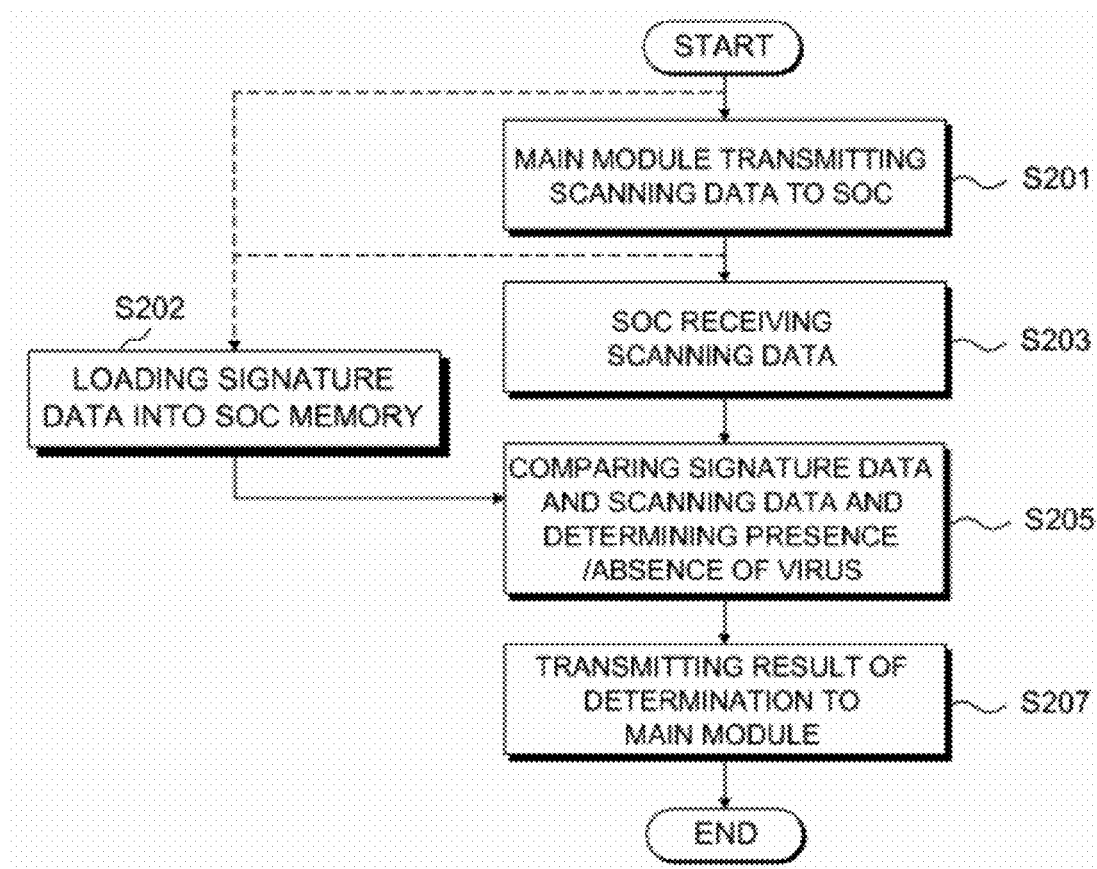
FIG. 15 is a flowchart illustrating a virus scanning method using a SOC according to an exemplary embodiment.

FIG. 15 is a flowchart illustrating a virus scanning method using a SOC according to an exemplary embodiment.

Referring to FIGS. 1, 2, and 15, a scanning method according to an exemplary embodiment will be explained below. The main module 200 transmits scanning data to the SOC 250 (operation S201) and the SOC 250 receives the scanning data (operation S203).

The SOC 250 loads signature data into the memory 255 (SOC memory) (operation S202), and compares the signature data and the scanning data and determines presence/absence of a virus (operation S205). The SOC 250 transmits a result of the determination to the main module 200 (operation S207). According to an exemplary embodiment, operation S202 of loading the signature data into the memory 255 is performed at any time before operation S205 starts, as illustrated by dotted lines in FIG. 15.

According to an exemplary embodiment, the AV/FW application 207 may transmit the scanning data to the I/O interface 263 of the SOC 250 through the AV/FW driver 209 (operation S201). After that, the AV engine 265 compares the signature data and the scanning data received by the I/O interface 263 and determines presence/absence of a virus (operation S205). The signature data may be stored in the storage unit 211 of the main module or the storage unit 267 of the SOC 250 as shown in FIG. 2. The signature data stored in the storage unit 211 or the storage unit 267 may be loaded into the memory 255 (SOC memory) when the AV engine 265 operates or before the AV engine 265 operates (operation S202) and is used for the scanning operation.

In the above description, the virus scanning method using the SOC has been explained, applying the exemplary embodiments of FIGS. 1 and 2. However, the virus scanning method may be applied to the other exemplary embodiments (for example, FIGS. 3 to 14).

Figure 16:
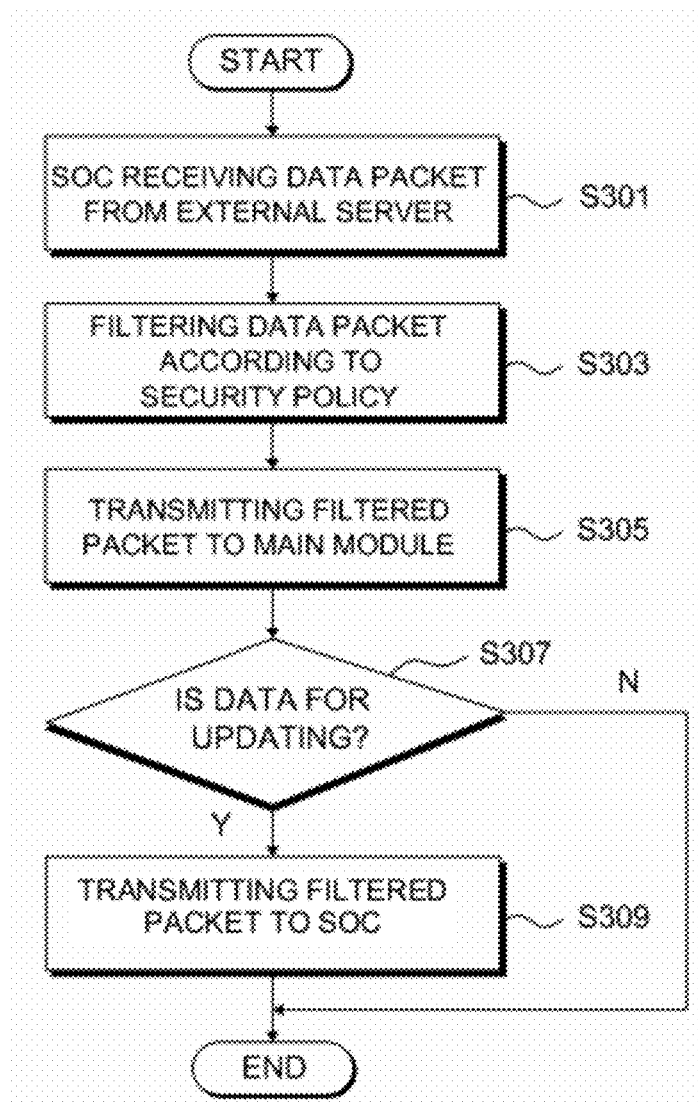
FIG. 16 is a flowchart illustrating an updating process used in the virus scanning method using the SOC according to an exemplary embodiment.

FIG. 16 is a flowchart illustrating an updating process used in a virus scanning method using a SOC according to an exemplary embodiment.

Referring to FIGS. 1, 2, and 16, a virus scanning method using a SOC according to an exemplary embodiment will be explained below. The SOC 250 receives a data packet from an external server (for example, the update server 100 or the web server 50) (operation S301). The data packet is filtered according to a predetermined security policy (operation S303). The SOC 250 transmits the filtered packet to the main module 200 (operation S305), and the main module 200 determines whether the packet is data updating or not (operation S307). If the packet is data for updating (operation S307-Y), the main module 200 transmits the data for updating to the SOC 250 (operation S309).

According to an exemplary embodiment, the network interface 251 of the SOC 250 may receive the data packet from the external server (update server 100 or web server 50) (operation S301), and the firewall 257 may filter the data packet received in operation S301 according to a predetermined security policy (operation S303). In operation S303, the packet identification unit 259 identifies where the packet comes from and the packet filtering unit 261 filters the packet according to a result of identification.

The CPU_SOC 253 may transmit the filtered packet to the main module 250 through the network interface 251 (operation S305). The AV/FW application 207 or the CPU_MAIN 201 of the main module 250 determines whether the data packet transmitted in operation S305 is data for updating or not (operation S307). If the data packet is data for updating (operation S307-Y), the data packet is transmitted to the I/O interface 263 of the SOC 250 (operation S309).

In the above-described exemplary embodiment, the AV/FW application 207 or the CPU_MAIN 201 determines whether the data packet is data for updating or not. However, an element other than the AN application 207 and the CPU_MAIN 201 may be adapted to perform such a determining operation. Also, the CPU_SOC 253 transmits the filtered packet to the main module 250 through the network interface 251 according to the present exemplary embodiment. However, it is understood that another exemplary embodiment is not limited thereto, and this operation may be performed by an element other than the CPU_SOC 253.

In the above description, the virus scanning method using the SOC has been described, applying the exemplary embodiments of FIGS. 1 and 2. However, the virus scanning method may be applied to the other exemplary embodiments (for example, FIGS. 3 to 14). If the SOC does not include the network interface separately and includes a transceiving unit in the exemplary embodiments of FIGS. 3 to 14, the transceiving unit may perform operation S301 and may be used to transmit the filtered packet to the main module 200.

Figure 17:
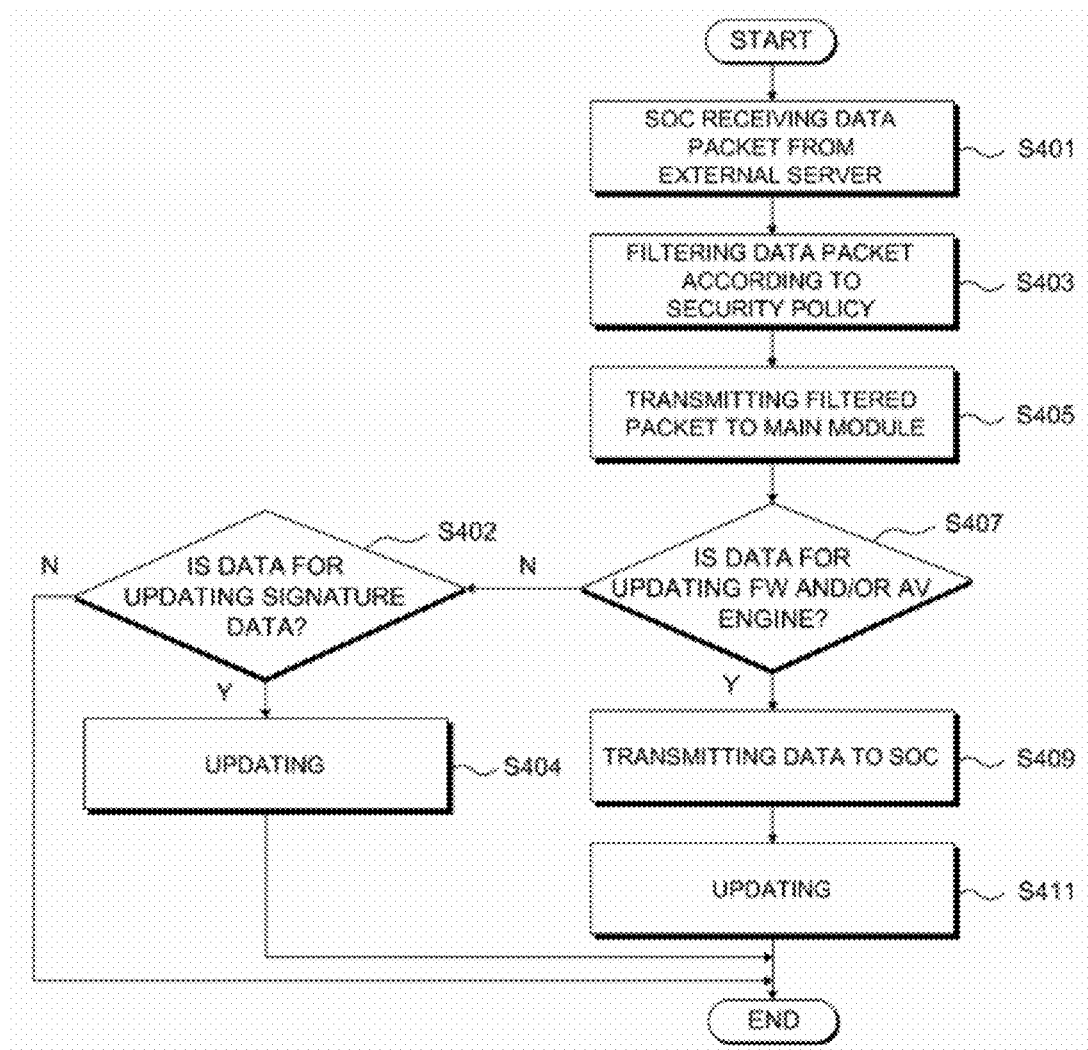
FIG. 17 is a flowchart illustrating an updating process used in the virus scanning method using a SOC according to another exemplary embodiment.

FIG. 17 is a flowchart illustrating an updating process used in a virus scanning method using a SOC according to another exemplary embodiment.

In the exemplary embodiment of FIG. 17, it is assumed that signature data is stored in and managed by the main module 250. Referring to FIGS. 1, 2, and 17, a virus scanning method using a SOC according an exemplary embodiment will be explained below. The SOC 250 receives a data packet from an external server (for example, the update server 100 or the web server 50) (operation S401). The data packet is filtered according to a predetermined security policy (operation S403). The SOC 250 transmits the filtered packet to the main module 200 (operation S405), and the main module 200 determines whether the packet is data for updating or not (operation S402 or S407). If the packet is data for updating the FW and/or the AV engine (operation S407-Y), the packet is transmitted to the SOC 250 (operation S409) and the SOC 250 performs an updating operation (operation S411).

If the packet is data for updating signature data (operation S402-Y), the main module 200 performs an updating operation (operation S404).

Operations S401, 403, 405, 409, and S411 of FIG. 17 are similar to operations S301, S303, S305, S309, and S311 of FIG. 16 and thus a detailed description thereof will be omitted.

The virus scanning method of FIG. 17 has been described, applying the exemplary embodiments of FIGS. 1 and 2. However, the virus scanning method of FIG. 17 may be applied to the other exemplary embodiments (for example, FIGS. 3 to 14). If the SOC does not include the network interface separately and includes a transceiving unit in the exemplary embodiments of FIGS. 3 to 14, the transceiving unit may perform operation S401 and the filtered packet may be transmitted to the main module 200 through the transceiving unit.

Figure 18:
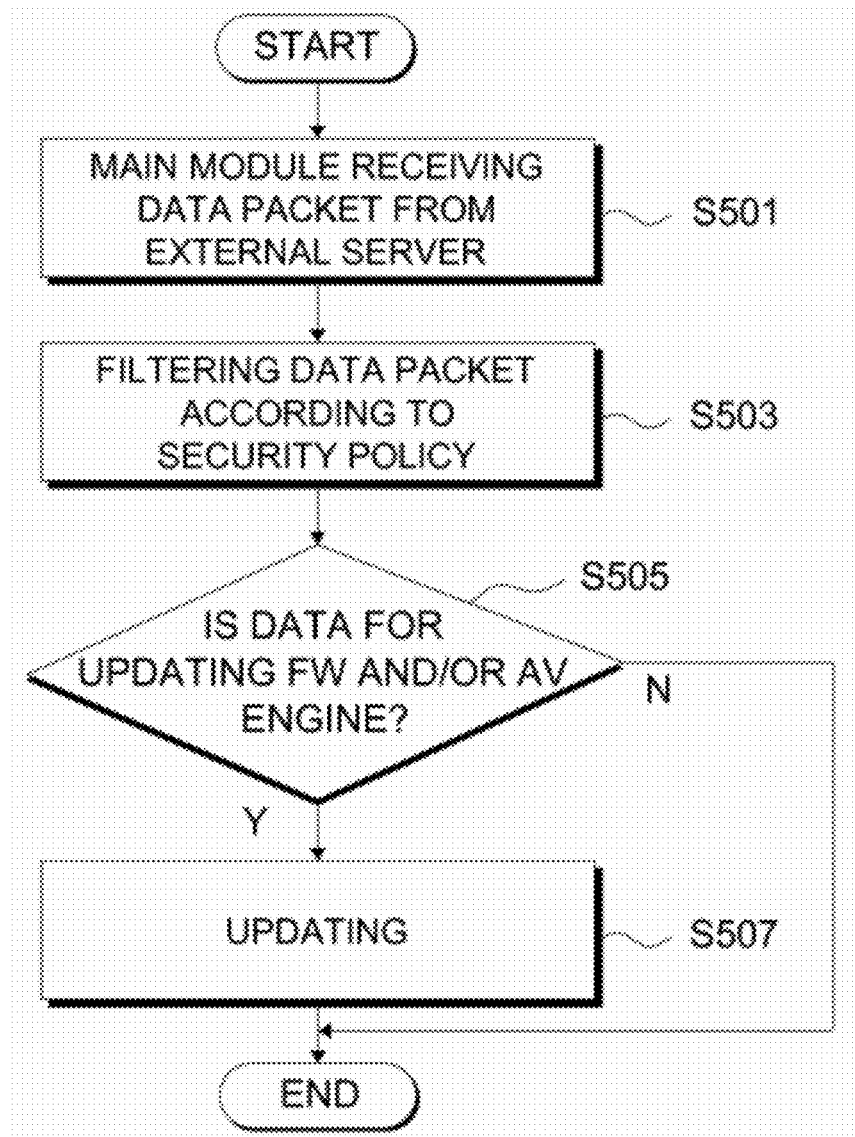
FIG. 18 is a flowchart illustrating a data packet filtering process used in the virus scanning method using the SOC according an exemplary embodiment.

FIG. 18 is a flowchart illustrating a data packet filtering process used in a virus scanning method using a SOC according to an exemplary embodiment.

In the exemplary embodiment of FIG. 18, it is assumed that a network interface is provided in the main module 200 and signature data is stored in the SOC. Referring to FIGS. 1, 4, and 18, a virus scanning method using a SOC according to an exemplary embodiment will be explained below.

The network interface 419 of the main module 200 receives a data packet from an external server (for example, the update server 100 or the web server 50) (operation S501). The received data packet is transmitted to the transceiving unit 471 of the SOC 250 and the firewall 457 filters the data packet received by the transceiving unit 471 according to a predetermined security policy (operation S503).

If the filtered packet is data for updating, the SOC 250 performs an updating operation using the data for updating (operation S507). For example, the CPU_SOC 453 or a separately provided element update the AV engine or the FW engine using the data for updating.

The virus scanning method of FIG. 18 has been described above, applying the exemplary embodiments of FIGS. 1 and 4. However, the virus scanning method of FIG. 18 may be applied to exemplary embodiments in which the main module 200 includes the network interface (for example, FIGS. 5 to 8).

Figure 19:
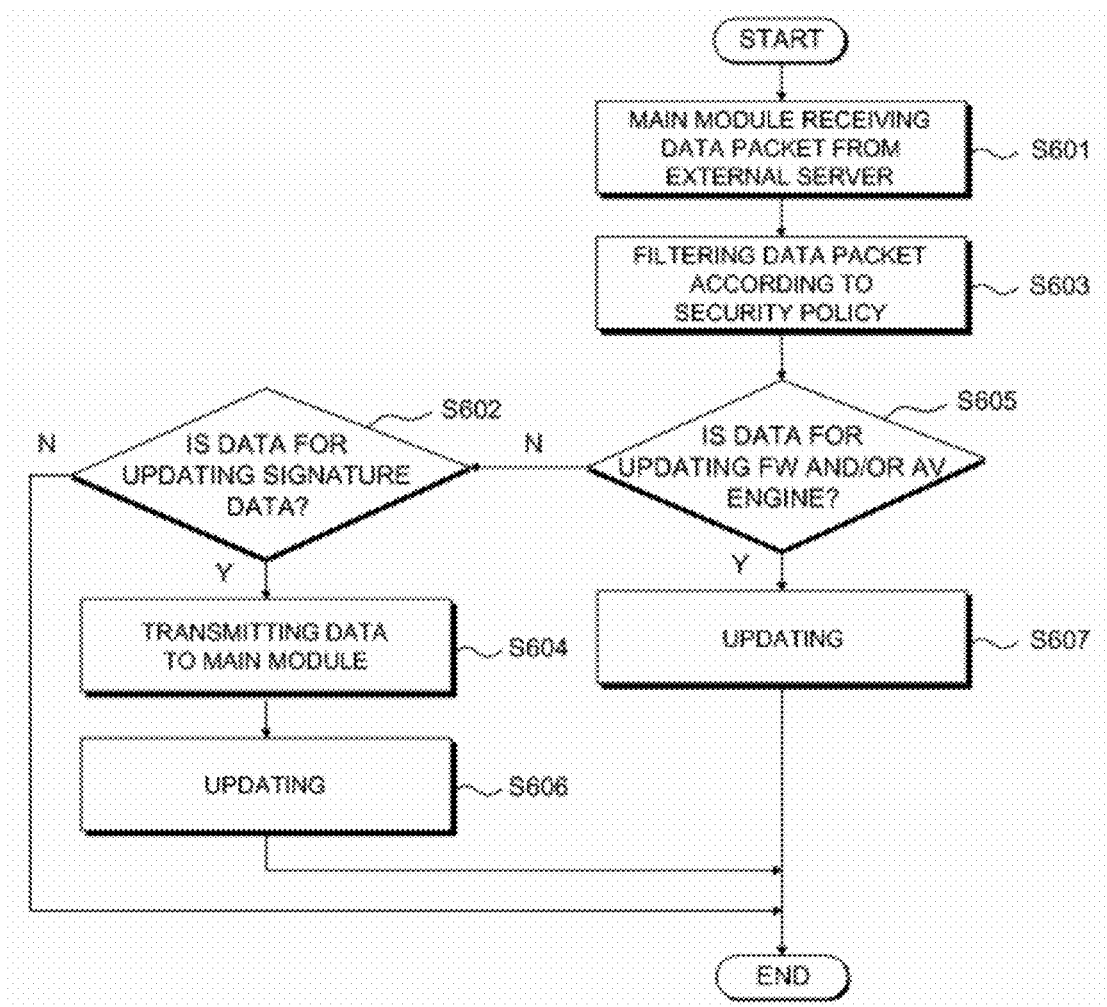
FIG. 19 is a flowchart illustrating a data packet filtering process used in the virus scanning method using the SOC according to another exemplary embodiment.

FIG. 19 is a flowchart illustrating a data packet filtering process used in a virus scanning method using a SOC according to another exemplary embodiment.

In the exemplary embodiment of FIG. 19, it is assumed that a network interface is provided in the main module 200 and signature data is stored in the main module 200. Referring to FIGS. 1 and 4 and FIG. 19, a data packet filtering process in a virus scanning method using a SOC according to another exemplary embodiment will be explained below. The network interface 419 of the main module 200 receives a data packet from an external server (for example, the update server 100 or the web server 50) (operation S601). The received data packet is transmitted to the transceiving unit 471 of the SOC 250, and the firewall 457 filters the data packet received by the transceiving unit 471 according to a predetermined security policy (operation S603).

If the filtered packet is data for updating the FW and/or the AV engine, the SOC 250 updates the FW and/or the AV engine using the packet (operation S607). For example, the CPU_SOC 453 or a separately provided element update the AV engine or the FW engine using the data for updating.

On the other hand, if the filtered packet is data for updating the signature data (operation S602-Y), the filtered data is transmitted to the main module 200 (operation S604). The main module 200 updates the signature data (operation S606).

The virus scanning method of FIG. 19 has been described, applying the exemplary embodiment of FIGS. 1 and 4. However, the virus scanning method of FIG. 19 may be applied to other exemplary embodiment in which the main module 200 includes the network interface and stores the signature data (for example, FIGS. 5 to 8).

Figure 21:
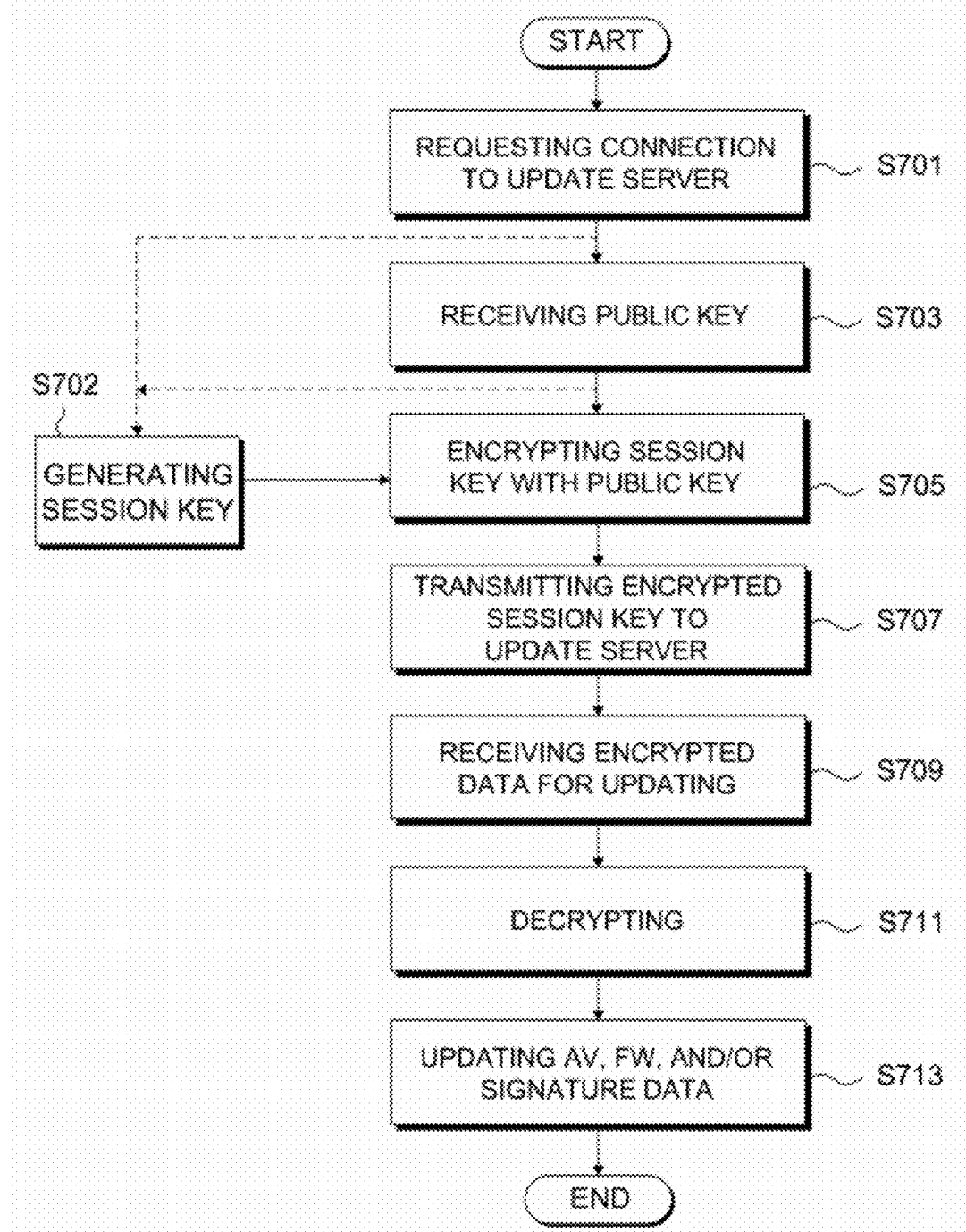
FIG. 21 is a flowchart illustrating an encrypting and decrypting process used in the virus scanning method using the SOC according to another exemplary embodiment.

FIG. 21 is a flowchart illustrating an encrypting and decrypting process used in a virus scanning method using a SOC according to an exemplary embodiment.

In the embodiment of FIG. 21, it is assumed that signature data is stored in the SOC. Referring to FIGS. 1 and 6 and FIG. 21, an encrypting and decrypting process according to an exemplary embodiment will be explained below.

If the device requests connection to the update server 100 (operation S701), the update server 100 transmits a public key which is paired with a secret key to the device and the device receives the public key (operation S703). The device encrypts a session key with the public key (operation S705), and transmits the encrypted session key to the update server 100 along with information regarding an encryption algorithm (operation S707). In operation S707, besides the session key, the encryption algorithm information may be encrypted. In other words, the encryption algorithm information may be encrypted with the public key received from the update server 100.

The update sever 100 decrypts the session key using the secret key which is paired with the public key transmitted to the device in operation S703 (operation S711), and encrypts data for updating using the session key and the encryption algorithm and transmits the data for updating to the device. The device decrypts the data using the session key and performs an updating operation (operation S713).

Operation S702 in which the device generates the session key may be performed at any time before operation S705 starts, as illustrated by dotted lines.

The above-described exemplary embodiment assumes that the updating operation is performed in the pull method. However, the updating operation may be performed in the push method. In this case, operation S701 may be changed such that the update server 100 requests connection to the device. The next operations are the same as in FIG. 21.

Figure 22:
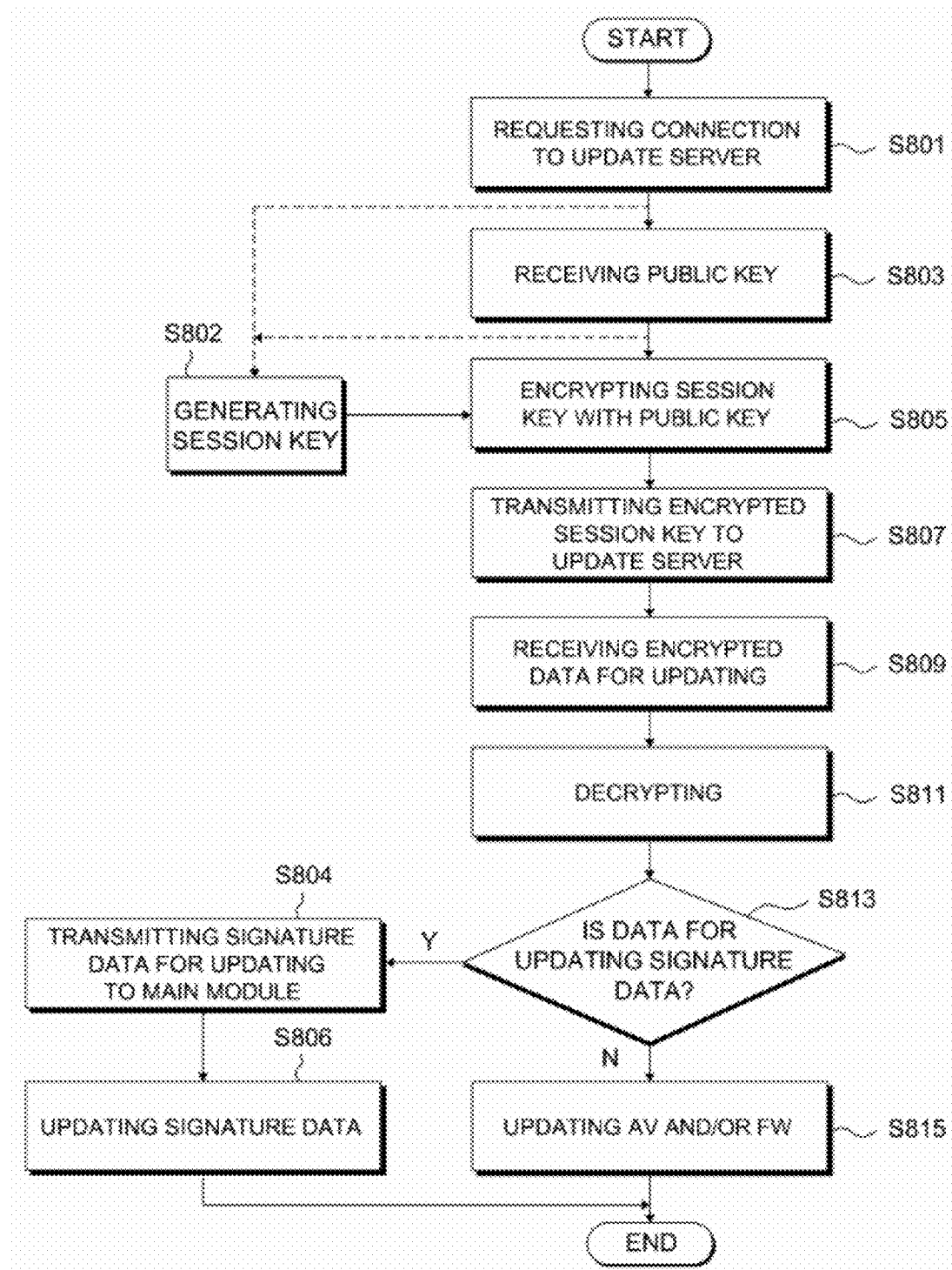
FIG. 22 is a flowchart illustrating an encrypting and decrypting process used in the virus scanning method using the SOC according to another exemplary embodiment.

FIG. 22 is a flowchart illustrating an encrypting and decryption process used in a virus scanning method using a SOC according to another exemplary embodiment.

In the exemplary embodiment of FIG. 22, it is assumed that signature data is stored in the main module 200. The exemplary embodiment of FIG. 22 differs from the exemplary embodiment of FIG. 21 in that the virus scanning method further includes operations S803 and S813. For example, operations S801, S802, S803, S805, S807, S809, and S811 may be the same as operations S701, S702, S703, S705, S707, S709, and S711.

A difference between the exemplary embodiment of FIG. 21 and the exemplary embodiment of FIG. 22 will be mainly explained. If data for updating is determined to be data for updating signature data in operations S813 and S804, the data for updating is transmitted to the main module 200. On the other hand, if the data for updating is determined to be data for updating the AV and/or the FW engine, the data for updating is used in the updating operation of the SOC without being transmitted to the main module 200.

FIGS. 23 to 28 are views to explain effects of the SOC according to exemplary embodiments.

Figure 23:
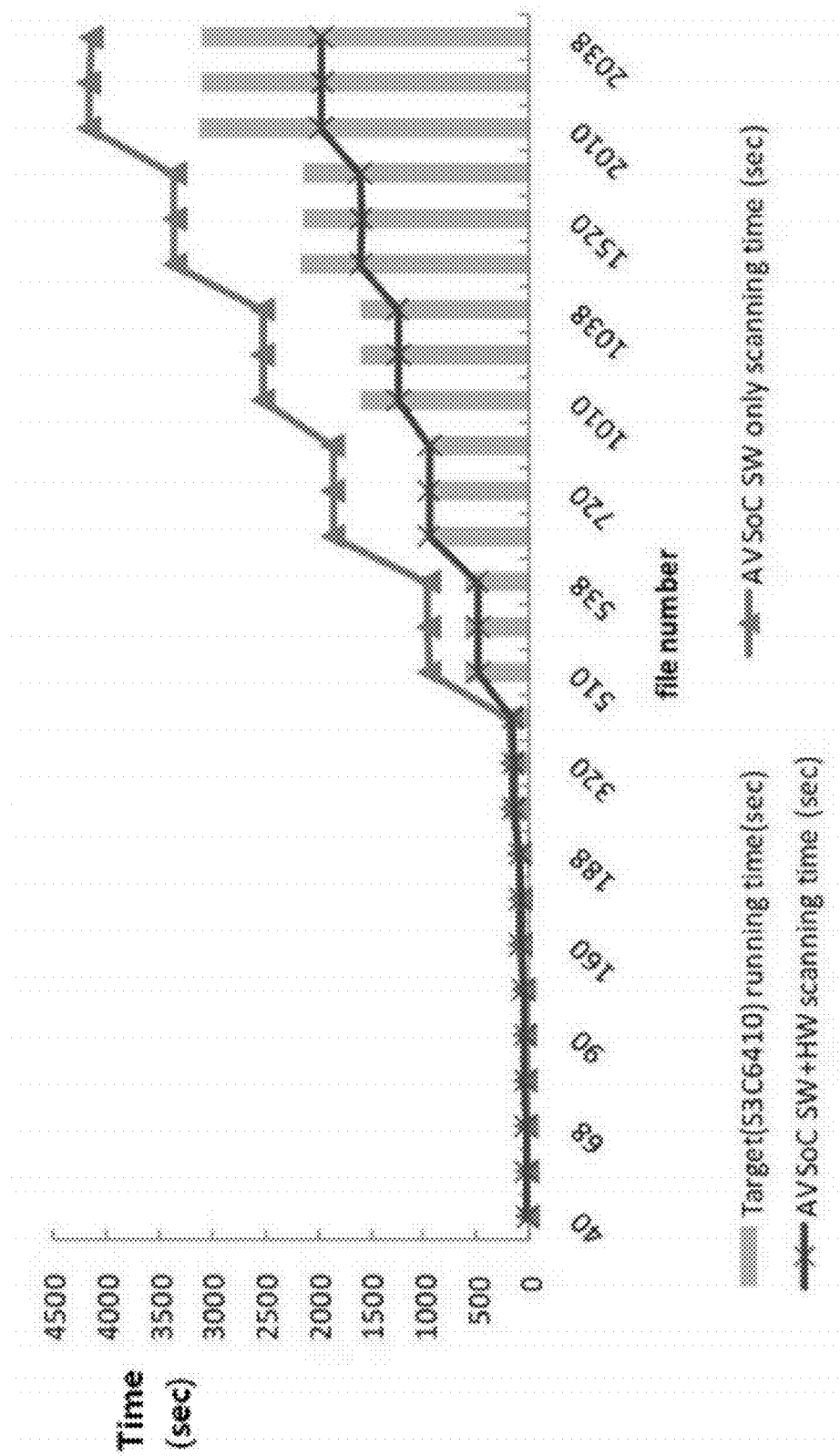
FIGS. 23 to 26 are views to explain effects of the SOC according to exemplary embodiments.

FIG. 23 illustrates a scanning speed when an anti-virus scanning engine using the same algorithm is tested for a malware scanning operation on an application layer (hereinafter, referred to as 'TEST 1') and a scanning speed when a SOC-based anti-virus scanning engine is tested for a malware scanning operation.

In FIG. 23, the scanning speed of TEST 1 is expressed by bars and results of testing the SOC-based anti-virus engine are expressed by curved lines. The lower curved line indicates a result of performing malware scanning using a SOC-based anti-virus engine configured by software and hardware logic (hereinafter, referred to as 'TEST 2'), and the upper curved line indicates a result of performing malware scanning using a SOC-based anti-virus engine configured only by software (hereinafter, referred to as 'TEST 3').

In FIG. 23, TEST 1 uses a CPU of 800 MHz, and TEST 2 and TEST 3, which are done on an FPGA board for a SOC, use a CPU of 50 MHz. Accordingly, if the tests are done using a CPU having the same speed, it is expected that TEST 2 and TEST 3, which are done on the SOC, have much higher scanning speeds than that of TEST 1.

FIG. 23 indicates that TEST 2 requires more time to scan than TEST 1. However, if a difference in the speed of CPUs is considered, it is predicted that the SOC-based anti-malware engine configured only by software requires less time to scan than the anti-malware engine operated on the application layer.

On the other hand, TEST 3 has a higher scanning speed than TEST 1 despite the difference in the speed of the CPUs. In other words, if the number of files to be scanned exceeds 2,000, the scanning speed of TEST 3 is 1.5 times higher than the scanning speed of TEST 1.

Figure 24:
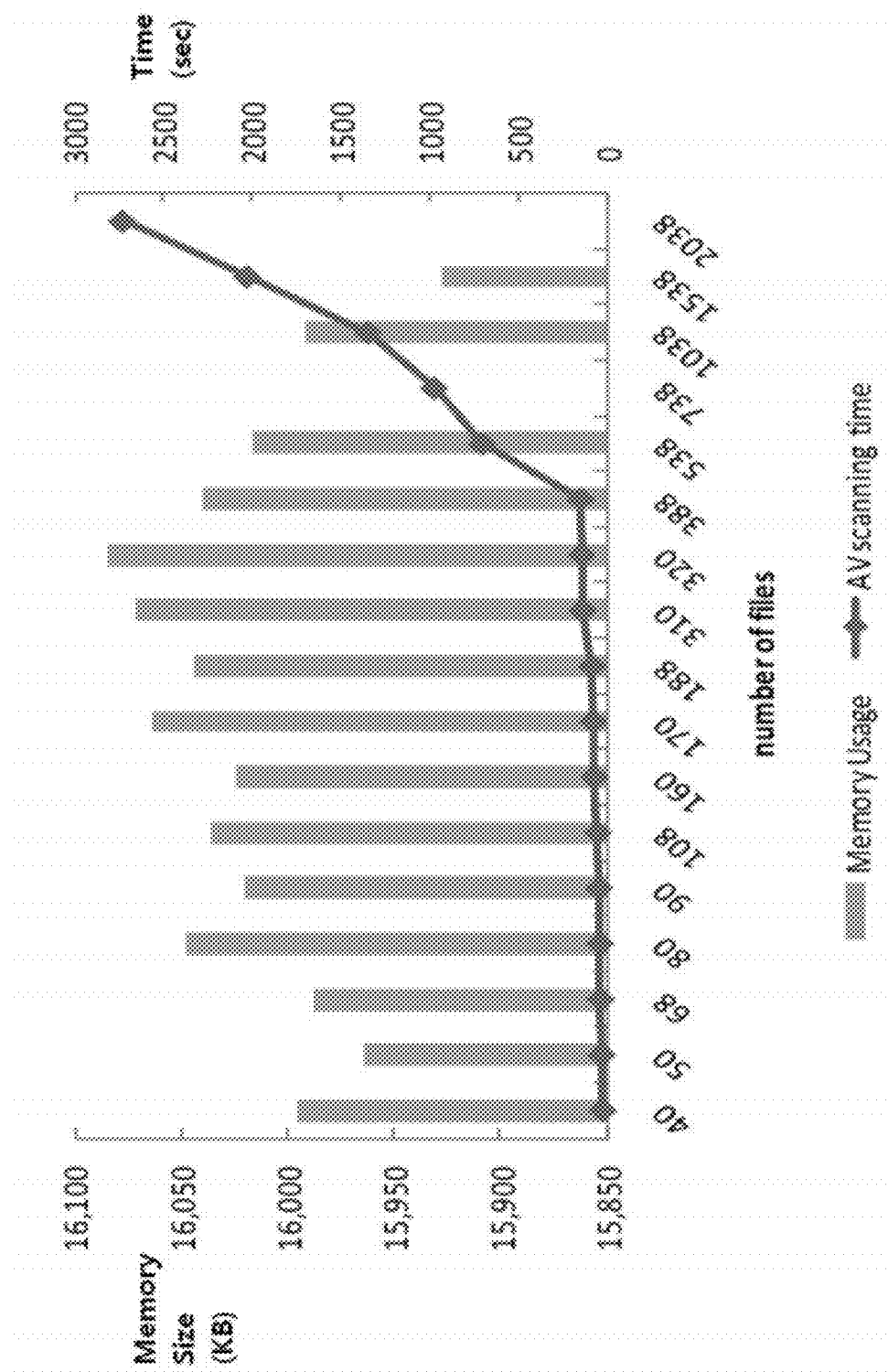

FIG. 24 illustrates memory usage and a scanning time when a malware scanning is performed using a mobile non-SOC-based and commercialized anti-virus engine.

In FIG. 24, bars indicate memory usage for the malware scanning, and a curved line indicates a time required for the malware scanning. In FIG. 24, a CPU of 800 MHz is used. As shown in FIG. 24, the memory usage of the non-SOC-based anti-virus engine is high even in a state where the number of files is low.

Also, FIG. 24 indicates that the bar height is reduced as the number of files is more than 320. However, this is because of a swapping operation of the memory. If the number of files to be scanned increases to a point higher than the memory is able to handle, the operating system may perform a swapping operation of the memory. The swapping operation may increase the scanning time and consequently battery consumption increases.

Figure 25:
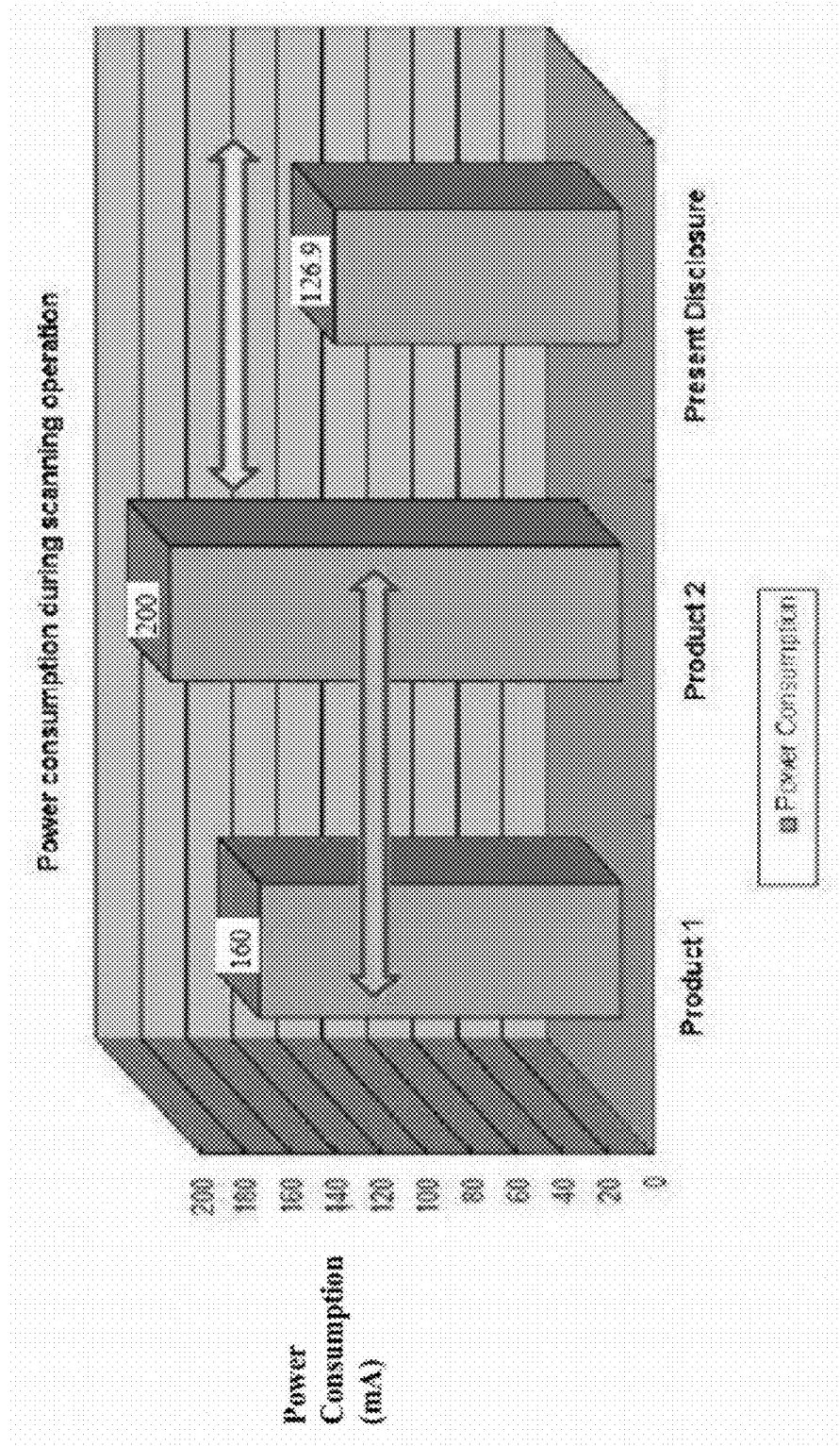

FIG. 25 illustrates power consumption of anti-virus engines, as a result of testing commercialized products and a SOC-based anti-virus engine according to an exemplary embodiment.

Referring to FIG. 25, the commercialized product 1 and the commercialized product 2 to be compared are anti-virus engines realized only by software, not based on SOC, and consume about 160 mA and about 200 mA, respectively. On the other hand, the SOC-based anti-virus scanning engine according to an exemplary embodiment is an engine configured by software and hardware logic and consumes about 126.9 mA.

Figure 26:
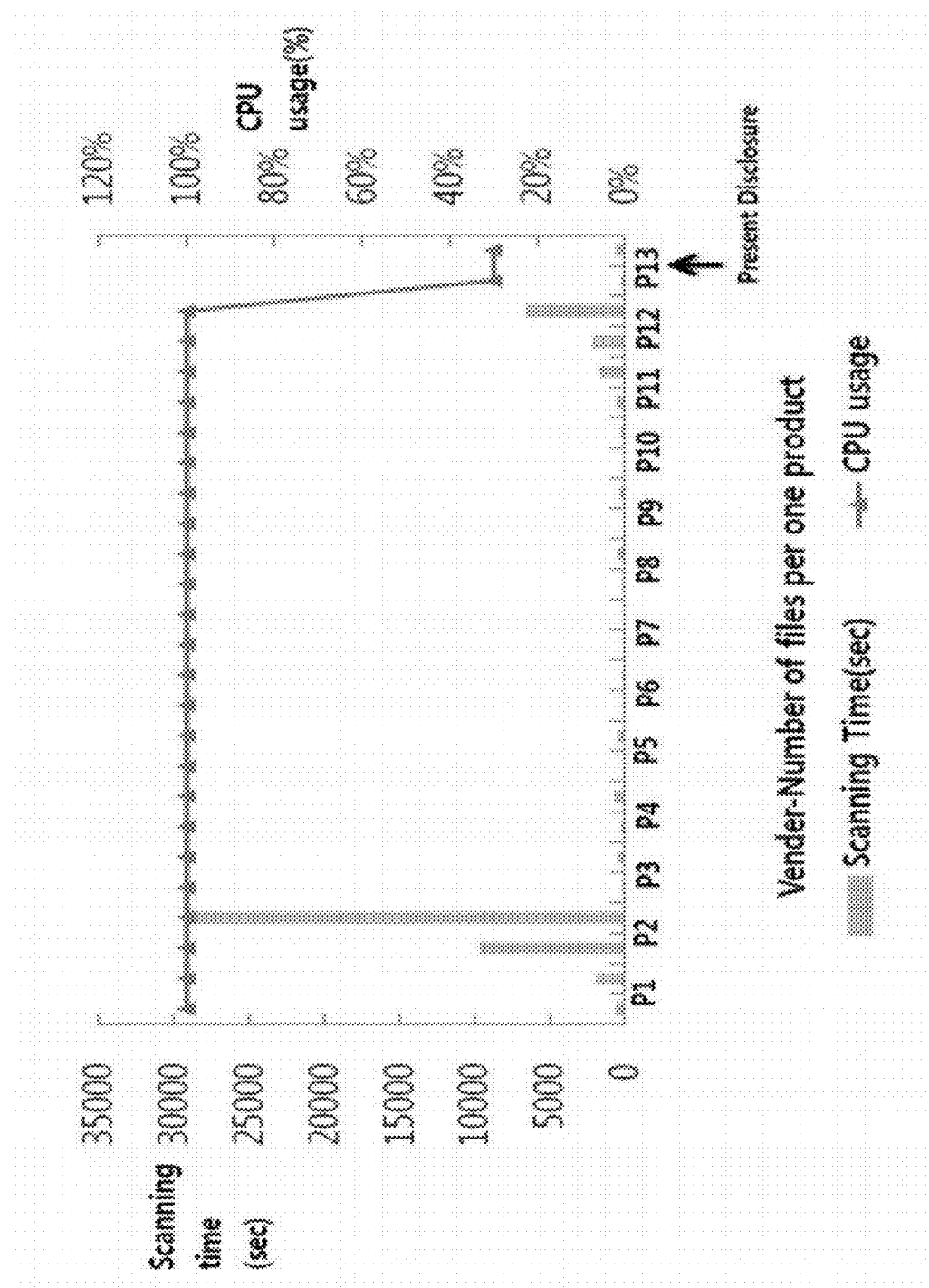

FIG. 26 illustrates a malware scanning time and a CPU usage time, as a result of testing products for use in a mobile phone and a SOC-based anti-virus engine according to an exemplary embodiment.

FIG. 26 illustrates results of testing the products P1, P2, P3, P4, P5, P6, P7, P8, P9, P10, P11, P12 and the SOC-based anti-virus engine P13 according to an exemplary embodiment two times for each product with different numbers of files to be scanned. In FIG. 26, the expression "Vender-Number of files" means that each of products P1, P2, P3, P4, P5, P6, P7, P8, P9, P10, P11, and P12 was tested two times with different numbers of files to be scanned.

In FIG. 26, the CPU usage of the commercialized products is almost 100% and is much higher than that of the SOC-based anti-virus engine P13. As the CPU usage and the scanning time increase, battery consumption increases. Therefore, the present exemplary embodiment has an effect of reducing battery consumption.

In addition, the preset exemplary embodiment P13 is tested using an FPGA board having a CPU of 50 MHz, whereas the products use CPUs of several hundred MHz to several GHz. Therefore, it is predicted that the present exemplary embodiment is greatly superior to the products in view of the CPU usage or the scanning time if the test is done under the same condition.

If the SOC-based AV is used, a main processor maintains security using less CPU or memory capacity and the CPU has a spare space to allow a different application to be used. Therefore, the user can use different applications effectively.

According to exemplary embodiments, the scanning operation and the filtering operation on the data used in the device are performed through the SOC so that a security function can be provided swiftly and safely.

Also, according to exemplary embodiments, the anti-virus engine, the firewall, and the signature data used for the scanning operation are encrypted and transmitted so that a security operation can be provided more safely.

Also, according to exemplary embodiments, the SOC receives the data for updating directly from the update server and updates, separately from the main operation of the device, so that security can be tightened without affecting the performance of the device.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs.

The foregoing exemplary embodiments and advantages are merely exemplary and are not to be construed as limiting the present inventive concept. Exemplary embodiments can be readily applied to other types of apparatuses. Also, the description of exemplary embodiments is intended to be illustrative, and not to limit the scope of the claims, and many alternatives, modifications, and variations will be apparent to those skilled in the art.

What is claimed is:

1. A system-on-chip (SOC) for semiconductor intellectual property (IP), which is configured to be mounted on a mobile device, the SOC comprising:

a central processing unit (CPU);

an interface which receives scanning data from the mobile device;

a communication unit which receives signature data encrypted with a session key generated by the SOC;

a firewall which performs a filtering operation with respect to the encrypted signature data;

a decryption unit which decrypts the encrypted signature data;

a storage unit which stores the decrypted signature data; and an anti-virus engine which determines whether a virus exists in the scanning data using the decrypted signature data, wherein the filtering operation performed by the firewall comprises (i) determining a source and a destination of the encrypted signature data and (ii) determining whether to block the encrypted signature data or pass the encrypted signature data through the firewall based on a predetermined filtering policy, the determined source, and the determined destination, and wherein the decryption unit decrypts the encrypted signature data only in response to the encrypted signature data passing through the firewall according to the filtering operation.

2. The SOC for semiconductor IP as claimed in claim 1, further comprising a manager which performs an updating operation of the stored decrypted signature data stored in the storage unit,
wherein, in response to the decryption unit decrypting the encrypted signature updating data, the manager performs the updating operation using the decrypted signature updating data.

3. The SOC for semiconductor IP as claimed in claim 2, further comprising a key generator which generates the session key every time that a session is established with an update server,
wherein the communication unit transmits the session key to the update server and the update server encrypts the signature updating data using the session key.

4. The SOC for semiconductor IP as claimed in claim 3, wherein the update server transmits, to the communication unit, the encrypted signature updating data which is encrypted using the session key.

5. The SOC for semiconductor IP as claimed in claim 4, further comprising a key storage unit,
wherein the key generator generates a key which is paired with the session key when generating the session key, and stores the generated key in the key storage unit.

6. The SOC for semiconductor IP as claimed in claim 1, further comprising a key generator which generates the session key to be used to encrypt the signature updating data for updating the signature data,
wherein the signature updating data is encrypted using the session key generated by the key generator.

7. The SOC for semiconductor IP as claimed in claim 6, further comprising:
an encryption unit which encrypts the generated session key generated by the key generator using a predetermined encryption key; and
wherein the communication unit transmits the encrypted session key encrypted by the encryption unit to an update server.

8. The SOC for semiconductor IP as claimed in claim 7, wherein the predetermined encryption key used by the encryption unit is a public key which is distributed by the update server.

9. The SOC for semiconductor IP as claimed in claim 7, wherein the encryption unit encrypts information regarding an encryption algorithm used to encrypt the generated session key generated by the key generator,
wherein the communication unit transmits the encrypted information regarding the encryption algorithm to the update server along with the encrypted session key.

10. The SOC for semiconductor IP as claimed in claim 1, wherein the anti-virus engine comprises a first hardware logic which determines whether the virus exists in the scanning data.

11. The SOC for semiconductor IP as claimed in claim 1, wherein the firewall comprises a second hardware logic which performs the filtering operation.

12. The SOC for semiconductor IP as claimed in claim 1, wherein:
the anti-virus engine comprises a first hardware logic which determines whether the virus exists in the scanning data; and
the firewall comprises a second hardware logic which performs the filtering operation.

13. A mobile device comprising:
a main module-which has scanning data; and
a system-on-chip (SOC) for semiconductor intellectual property (IP) which is configured to be mounted on the mobile device,
wherein the SOC comprises:
a central processing unit (CPU);
an interface which receives scanning data from the main module;
a communication unit which receives signature data encrypted with a session key generated by the SOC;
a firewall which performs a filtering operation with respect to the encrypted signature data;
a decryption unit which decrypts the encrypted signature data;
a storage unit which stores the decrypted signature data; and
an anti-virus engine which determines whether a virus exists in the scanning data using the decrypted signature data,
wherein the filtering operation performed by the SOC comprises (i) determining a source and a destination of the encrypted signature data and (ii) determining whether to block the encrypted signature data or pass the encrypted signature data based on a predetermined filtering policy, the determined source, and the determined destination, and
wherein the SOC decrypts the encrypted signature data only in response to the encrypted signature data passing through the filtering operation.

14. The mobile device as claimed in claim 13, wherein at least a part of software performing the decrypting of the encrypted signature updating data is controlled by a processor of the main module or the CPU of the SOC for semiconductor IP.

15. The mobile device as claimed in claim 13, wherein the SOC for semiconductor IP generates the session key every time that a session is established with an update server, and transmits the generated session key to the update server,
wherein the update server encrypts the signature updating data using the session key and transmits the encrypted updating signature data.

16. The mobile device as claimed in claim 15, wherein the SOC for semiconductor IP generates a key which is paired with the session key when generating the session key and stores the generated key.

17. A method of scanning whether a virus exists in scanning data which operates in a main board of a mobile device, the method comprising:
receiving, by a system-on-chip (SOC) for semiconductor intellectual property (IP) mounted on the main board, signature data encrypted with a session key generated by the SOC;
performing a filtering operation with respect to the received signature data;
decrypting, by the SOC for semiconductor IP mounted on the main board, the encrypted signature data;
updating the decrypted signature data using decrypted signature updating data;
receiving, by the SOC for semiconductor IP, the scanning data from the main board; and
comparing, by the SOC for semiconductor IP, the received scanning data and the decrypted signature data and determining whether a virus exists in the received scanning data,
wherein the filtering operation comprises (i) determining a source and a destination of the encrypted signature data and (ii) determining whether to block the encrypted signature data or pass the encrypted signature data based on a predetermined filtering policy, the determined source, and the determined destination, and wherein the decrypted signature data is stored in the SOC for semiconductor IP.

18. The method as claimed in claim 17, wherein the SOC for semiconductor IP performs the filtering operation according to a security policy, and decrypts the signature updating data in response to the encrypted signature updating data satisfying the security policy.

19. The method as claimed in claim 17, wherein:
the SOC for semiconductor IP generates the session key every time that a session is established with an update server and transmits the generated session key to the update server; and
the update server encrypts the signature updating data using the session key and transmits the encrypted signature updating data to the SOC for semiconductor IP.

* * * * *